United States Patent
Nelson et al.

(10) Patent No.: US 10,203,157 B2
(45) Date of Patent: Feb. 12, 2019

(54) AIRFLOW IN AUTOCLAVES

(71) Applicant: The Boeing Company, Chicago, IL (US)

(72) Inventors: Karl Marius Nelson, Issaquah, WA (US); Tateh Wu, Bellevue, WA (US); Chao-Hsin Lin, Redmond, WA (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 14/721,750

(22) Filed: May 26, 2015

(65) Prior Publication Data

US 2016/0348976 A1    Dec. 1, 2016

(51) Int. Cl.
*F27D 7/04*     (2006.01)
*B29C 35/02*    (2006.01)

(52) U.S. Cl.
CPC ............ *F27D 7/04* (2013.01); *B29C 35/0227* (2013.01)

(58) Field of Classification Search
CPC ........................................................ F27D 7/04
See application file for complete search history.

(56) References Cited

U.S. PATENT DOCUMENTS

| | | | | |
|---|---|---|---|---|
| 2,782,789 A * | 2/1957 | Fisher | ................. | A24F 1/08 |
| | | | | 131/204 |
| 4,141,539 A * | 2/1979 | Bornor | ................. | C21D 1/767 |
| | | | | 236/15 BF |
| 4,854,863 A * | 8/1989 | Hemsath | ................. | C21D 1/767 |
| | | | | 432/146 |
| 4,974,663 A | 12/1990 | Nakaji | | |
| 6,872,918 B2 | 3/2005 | Toll | | |
| 7,849,901 B2 | 12/2010 | Lahmann et al. | | |
| 8,457,937 B2 | 6/2013 | Sinha et al. | | |
| 2001/0031491 A1 * | 10/2001 | Curtis | ................. | C12M 23/26 |
| | | | | 435/243 |
| 2008/0317647 A1 | 12/2008 | Taricco | | |

* cited by examiner

*Primary Examiner* — Regina M Yoo
(74) *Attorney, Agent, or Firm* — Yee & Associates, P.C.

(57) ABSTRACT

A method and system are presented. The system comprises a plurality of baffles positioned to split an airflow from a door of an autoclave into a counter-rotating flow pattern.

20 Claims, 18 Drawing Sheets

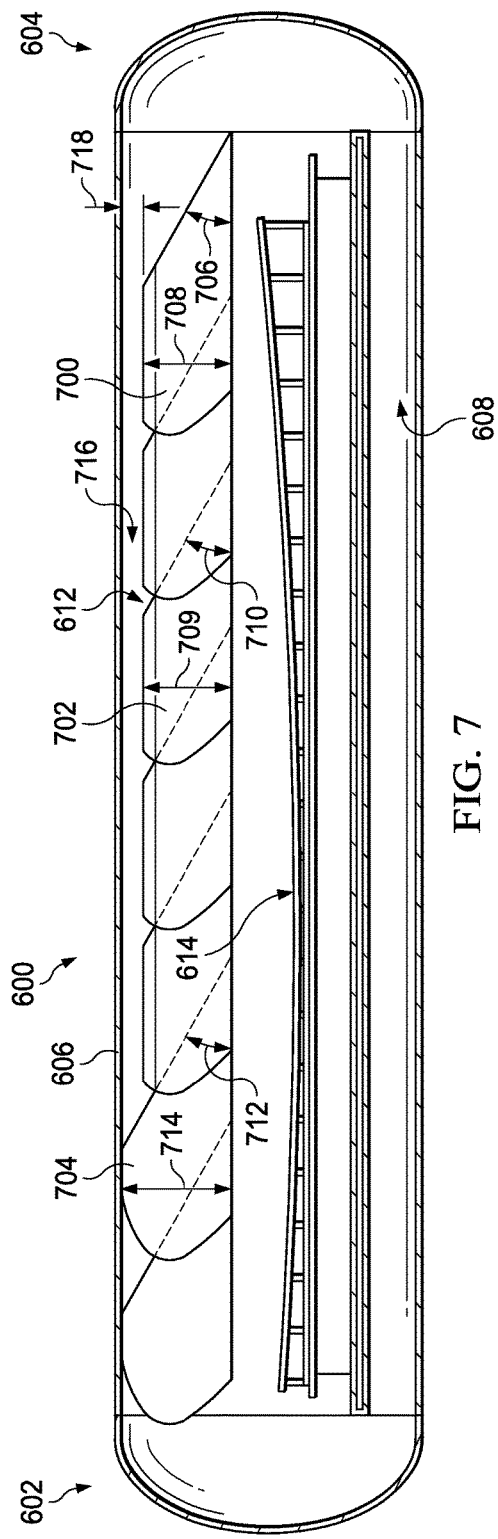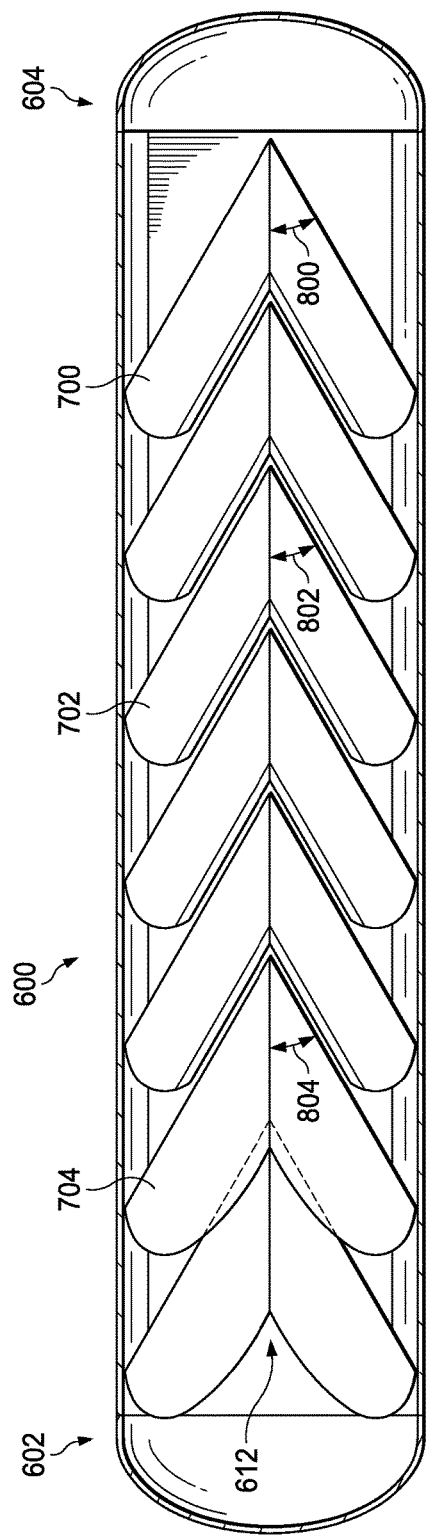

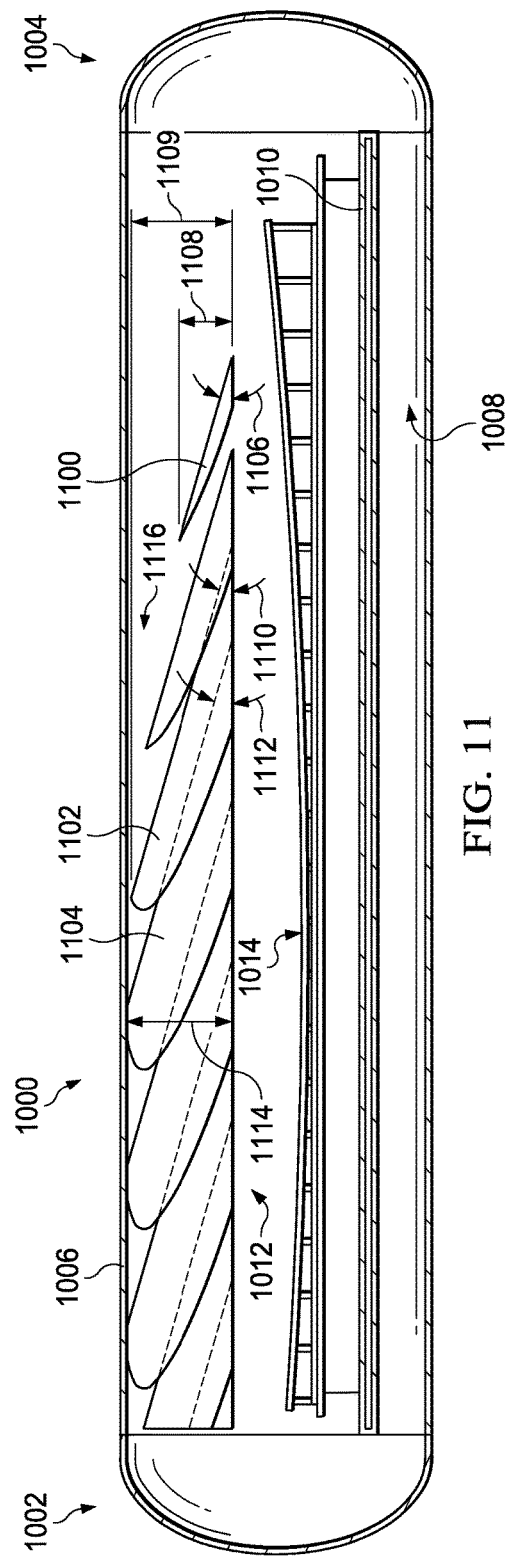
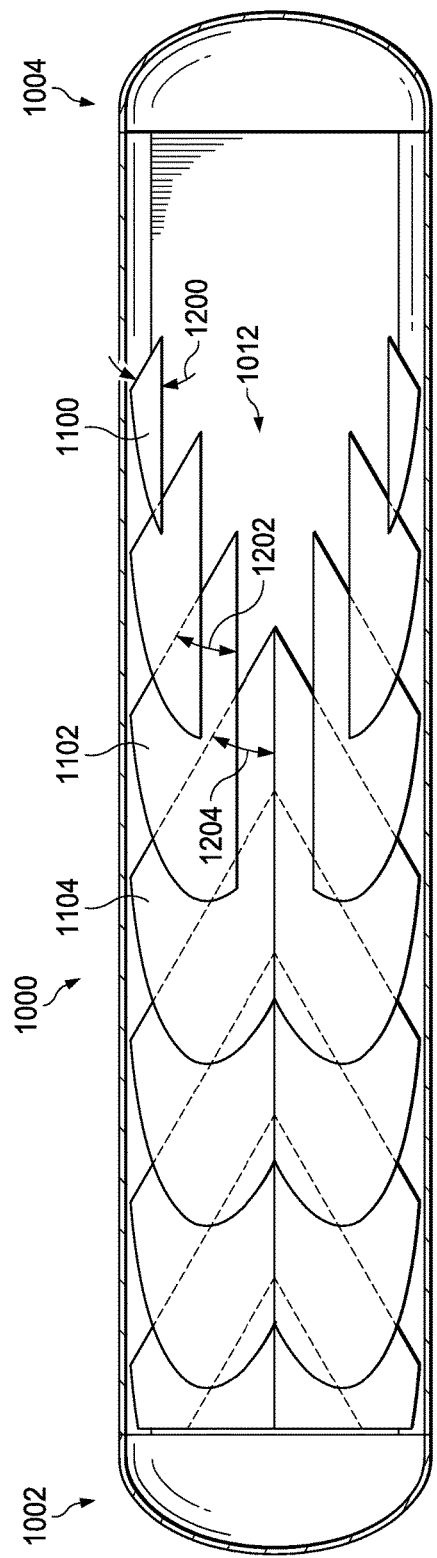

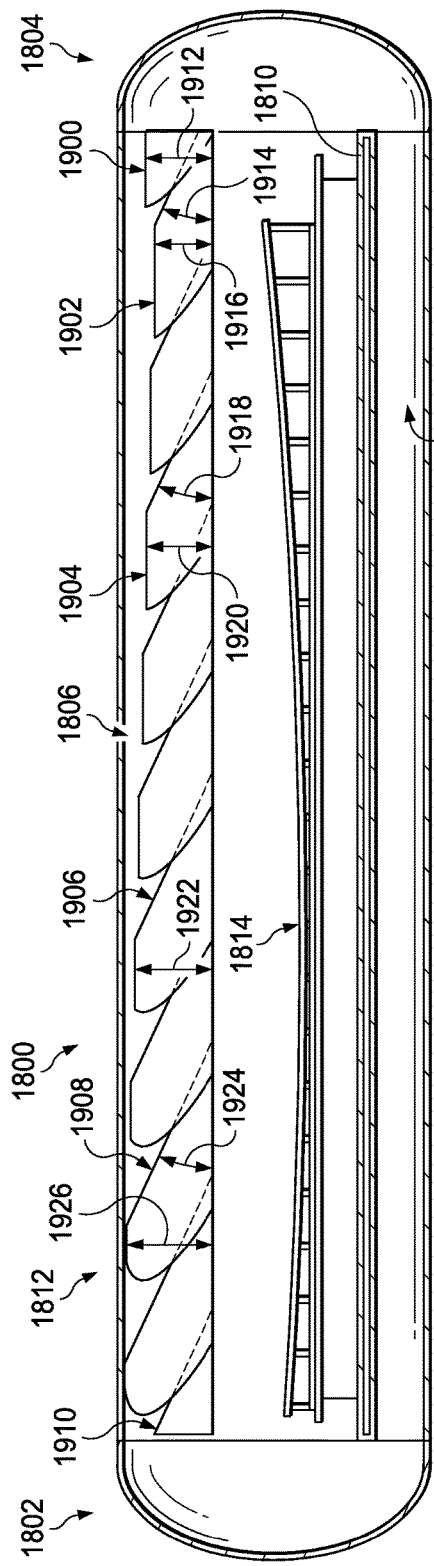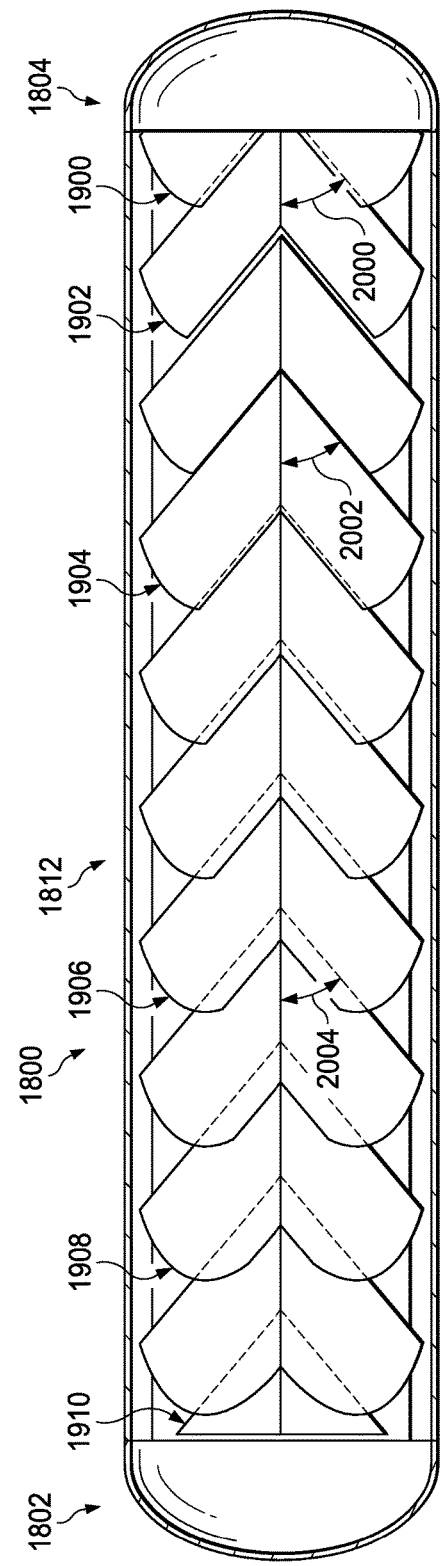
FIG. 19
FIG. 20

AIRFLOW IN AUTOCLAVES

BACKGROUND INFORMATION

1. Field

The present disclosure relates generally to autoclaves. The present disclosure relates more specifically to airflow in autoclaves. Still more particularly, the present disclosure relates to methods and apparatuses for changing an airflow pattern in an autoclave.

2. Background

An autoclave may be used to subject a part to at least one of elevated or depressed temperatures, elevated or depressed pressures, or special gas or humidity environments. An autoclave may apply at least one of heat or moving air to cure a composite part. The uniformity of the cure of the part may depend on the flow of air through the autoclave.

The flow of air may move preferentially toward areas of low flow resistance. These areas may include the ceiling and open areas of the autoclave. The flow of air may typically be away from the part being cured. Reduced airflow near the part may cause lower heat transfer. The lower heat transfer may make it difficult to heat the part efficiently and evenly. Lower heat transfer may be especially evident in the back of the autoclave, downstream, and underneath the part. Airflow may be encumbered underneath the part by at least one of the part itself or tooling structure forming the part. Lower heat transfer may be most evident in autoclaves which are long relative to their diameter and with long or narrow parts such as stringers, spars, and wing-skins. Lower heat transfer may also be evident in large autoclaves filled near capacity with a number of parts. Typically, airflow underneath complex tooling may be near-stagnant and heat transfer may be low. Low heat transfer may drive uneven heating and slow heating rates. Uneven heating and slow heating rates may undesirably increase cycle time of curing a part.

One conventional method of increasing airflow near a part is to change the airflow of the autoclave from horizontal to vertical. For example, multiple fans may direct air from the ceiling of the autoclave to the floor of the autoclave. However, this autoclave design may include more parts. As a result, this design may have a greater cost and a lower reliability.

Therefore, it would be desirable to have a method and apparatus that takes into account at least some of the issues discussed above, as well as other possible issues.

SUMMARY

One illustrative embodiment provides a system. The system comprises a plurality of baffles positioned to split an airflow from a door of an autoclave into a counter-rotating flow pattern.

Another illustrative embodiment of the present disclosure provides an apparatus. The apparatus comprises a V-shaped wedge associated with a ceiling of an autoclave. The V-shaped wedge has a height, a first angle, a second angle, and a third angle.

Another illustrative embodiment of the present disclosure provides a method for improving heat transfer of an autoclave. An airflow from a door of the autoclave is split into a plurality of streams. The plurality of streams are redirected into a counter-rotating flow pattern.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a side cross-sectional view of an autoclave with an implementation of a plurality of baffles in accordance with an illustrative embodiment;

FIG. 8 is an illustration of a top cross-sectional view of an autoclave with an implementation of a plurality of baffles in accordance with an illustrative embodiment;

FIG. 11 is an illustration of a cross-sectional view of an autoclave with an implementation of a plurality of baffles in accordance with an illustrative embodiment;

FIG. 12 is an illustration of a top cross-sectional view of an autoclave with an implementation of a plurality of baffles in accordance with an illustrative embodiment;

FIG. 19 is an illustration of a front cross-sectional view of an autoclave with an implementation of a plurality of baffles in accordance with an illustrative embodiment;

FIG. 20 is an illustration of a side cross-sectional view of an autoclave with an implementation of a plurality of baffles in accordance with an illustrative embodiment;

DETAILED DESCRIPTION

Figure 1:
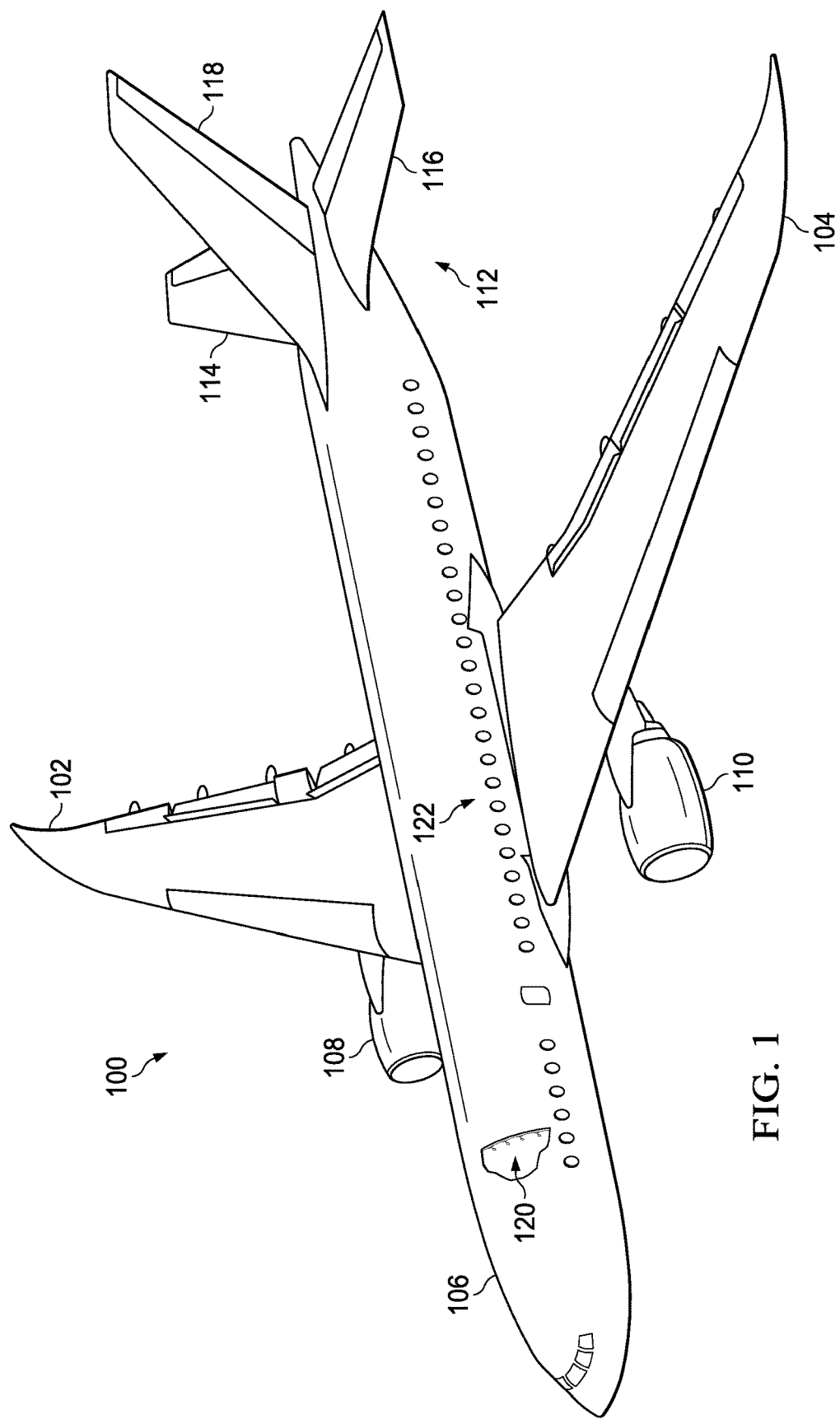
FIG. 1 is an illustration of an aircraft having a workpiece for which an illustrative embodiment may be implemented.

With reference now to the figures, and in particular, with reference to FIG. 1, an illustration of an aircraft is depicted for which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having stringers that may be cured in an autoclave having an altered airflow in accordance with an illustrative embodiment. For example, an autoclave may be used to cure stiffeners 120 to composite skin 122 of aircraft. FIG. 1 depicts an exposed view of stiffeners 120.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
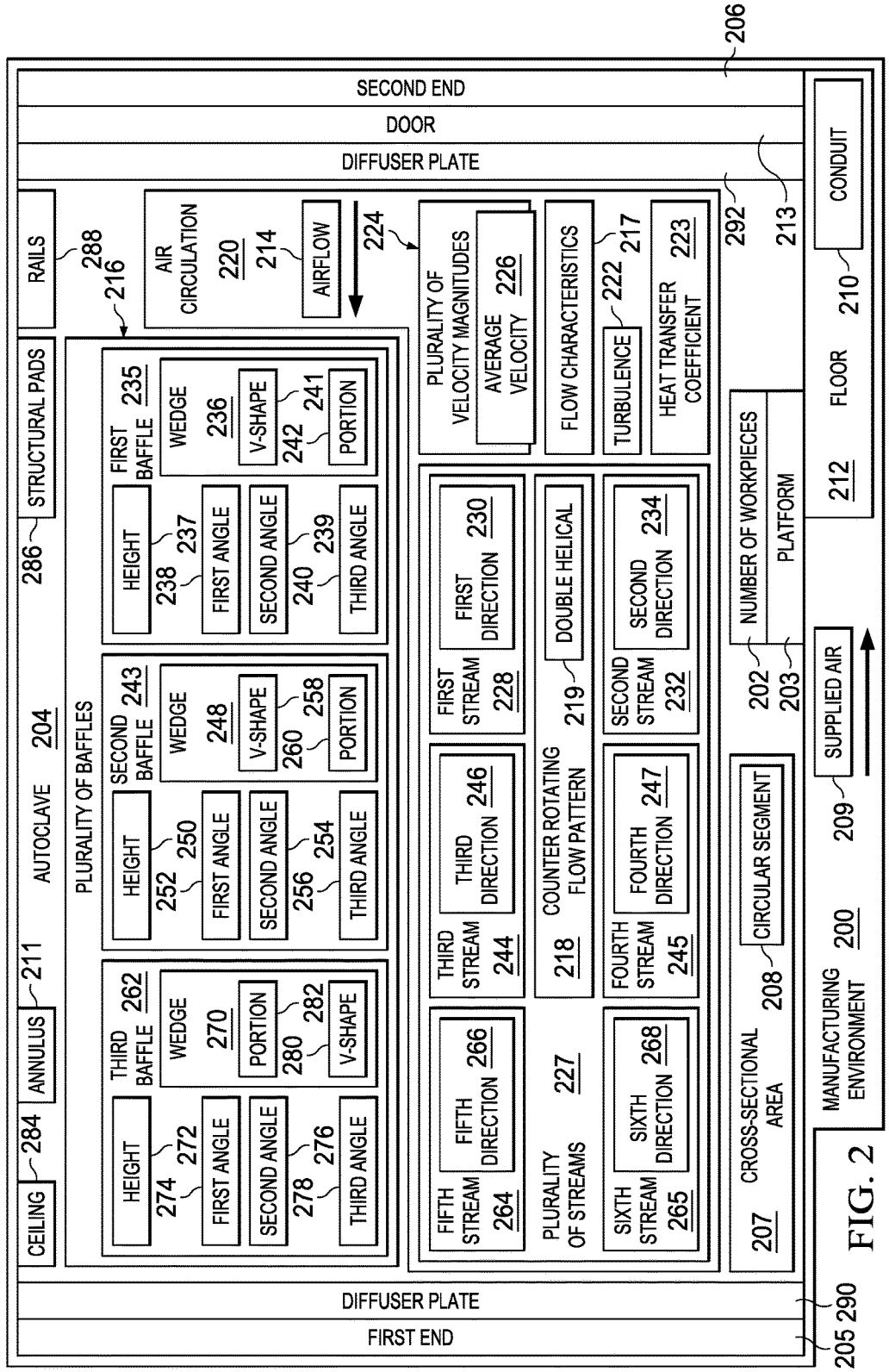
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 may be used to cure a composite material. Manufacturing environment 200 may be used to cure number of workpieces 202. In some illustrative examples, depending upon the size and shape of number of workpieces, number of workpieces 202 may rest on platform 203. As used herein, the phrase "a number of," means one or more items. For example, a number of stringers is one or more stringers. In some illustrative examples, number of workpieces 202 may be stiffeners 120 of FIG. 1.

Manufacturing environment 200 includes autoclave 204. Autoclave 204 has first end 205, second end 206, and cross-sectional area 207. Cross-sectional area 207 may be circular segment 208. Air may travel from second end 206 to first end 205. Air may exit autoclave 204 through first end 205. In some illustrative examples, air may be drawn through first end 205 using a fan or other desirable equipment.

Supplied air 209 may travel through at least one of conduit 210 or annulus 211 to second end 206 of autoclave 204. Conduit 210 may be positioned in floor 212. In some illustrative examples, conduit 210 may be referred to as a floor conduit. Second end 206 of autoclave 204 may include door 213. At least one of conduit 210 or annulus 211 channels supplied air 209 towards door 213 of autoclave 204. Supplied air 209 may be directed by door 213 to form airflow 214. Airflow 214 may ricochet from door 213 towards first end 205 of autoclave 204.

As airflow 214 reaches plurality of baffles 216, plurality of baffles 216 splits airflow 214 from door 213 of autoclave 204 into counter rotating flow pattern 218. Counter rotating flow pattern 218 may also be referred to as double helical 219. Plurality of baffles 216 may extend substantially the whole length of autoclave 204. In some illustrative examples, plurality of baffles 216 may extend from near second end 206 to near first end 205. In some illustrative examples, plurality of baffles 216 may extend approximately two-thirds of the length of autoclave 204. Plurality of baffles 216 may be positioned in line through the length of autoclave 204. Plurality of baffles 216 may be described as nested along the length of autoclave 204.

Air circulation 220 within autoclave 204 includes airflow 214 from second end 206, counter rotating flow pattern 218, as well as the movement of air throughout the remainder of autoclave 204. Plurality of baffles 216 causes flow characteristics 221 of air circulation 220 within autoclave 204 to be desirable. Counter rotating flow pattern 218 may provide desirable heat transfer properties for air circulation 220.

Counter rotating flow pattern 218 may increase turbulence 222 within autoclave 204. By increasing turbulence 222, counter rotating flow pattern 218 may improve heat transfer characteristics. By increasing turbulence 222, counter rotating flow pattern 218 may increase heat transfer coefficient 223. Heat transfer coefficient 223 may be a constant for heating and cooling calculations. For example, heat transfer coefficient 223 may be a proportionality constant for Newton's Law of Cooling. Heat transfer coefficient 223 may relate the amount of heat that is being transferred from a fluid to a solid interface. Heat transfer coefficient 223 may have the units of $(W/m^2 K)$ or $(BTU/hr*ft^2 F)$.

Counter rotating flow pattern 218 may create plurality of velocity magnitudes 224 through autoclave 204. Plurality of velocity magnitudes 224 may vary throughout autoclave 204. Further, plurality of velocity magnitudes 224 may vary around number of workpieces 202. For example, a velocity magnitude below number of workpieces 202 may be less than a velocity magnitude above number of workpieces 202. The majority of plurality of velocity magnitudes 224 may be greater than the velocity magnitudes within autoclave 204 if plurality of baffles 216 were not present. In other words, the presence of plurality of baffles 216 may increase the value of the majority of plurality of velocity magnitudes 224.

Further, average velocity 226 may be an average of plurality of velocity magnitudes 224. Average velocity 226 may be greater in magnitude with plurality of baffles 216 present than if plurality of baffles 216 were not present. In other words, the presence of plurality of baffles 216 may increase the value of average velocity 226 of air circulation 220.

In this illustrative example, air circulation 220 includes plurality of streams 227. Plurality of streams 227 includes first stream 228 that rotates in first direction 230 and second stream 232 that rotates in second direction 234. In some illustrative examples, first direction 230 is counter to second direction 234.

First baffle 235 may split airflow 214 into first stream 228 and second stream 232. First baffle 235 of plurality of baffles 216 is wedge 236 having height 237, first angle 238, second angle 239, and third angle 240. Height 237 may be chosen to create an overpass with plurality of baffles 216. An overpass may allow some of airflow 214 to pass over first baffle 235. First angle 238 may also be referred to as a pitch of first baffle 235. Second angle 239 may also be referred to as a yaw of first baffle 235. Third angle 240 may be used to form an underpass with plurality of baffles 216. An underpass may allow some of airflow 214 to pass under first baffle 235. Wedge 236 may have v-shape 241. In some illustrative examples, first baffle 235 may be only portion 242 of wedge 236. When first baffle 235 is only portion 242 of wedge 236, first baffle 235 may include two separate planes of wedge 236. The two separate planes may not meet at a joint. When wedge 236 is complete, wedge 236 includes a joint between two sides.

At least one of height 237, first angle 238, second angle 239, or third angle 240 may be changed to vary flow characteristics 221 of air circulation 220. For example, changing at least one of height 237, first angle 238, second angle 239, or third angle 240 may change the characteristics of at least one of first stream 228 or second stream 232. A value for at least one of height 237, first angle 238, second angle 239, or third angle 240 is selected based on at least one of measurements of autoclave 204, measurements of a workpiece to be processed in autoclave 204, or desirable processing parameters for the workpiece. The workpiece may be number of workpieces 202.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

Second baffle 243 may form third stream 244 and fourth stream 245 from air hitting second baffle 243. For example, a portion of airflow 214 may reach second baffle 243 and be split into counter rotating flow pattern 218 including at least a portion of at least one of third stream 244 or fourth stream 245.

Counter rotating flow pattern 218 includes third stream 244 that rotates in third direction 246 and fourth stream 245 that rotates in fourth direction 247 in plurality of streams 227. In some illustrative examples, third direction 246 is counter to fourth direction 247. In other illustrative examples, third direction 246 may be substantially the same as first direction 230. In some illustrative examples, fourth direction 247 may be substantially the same as second direction 234.

Second baffle 243 of plurality of baffles 216 is wedge 248 having height 250, first angle 252, second angle 254, and third angle 256. Height 250 may be chosen to create an overpass with plurality of baffles 216. In some illustrative examples, an overpass may allow some of airflow 214 to pass over second baffle 243. In some illustrative examples, height 237 and height 250 may be substantially the same. In other illustrative examples, height 250 may be greater than height 237. In these illustrative examples, a portion of airflow 214 may pass over first baffle 235 and hit second baffle 243.

First angle 252 may also be referred to as a pitch of second baffle 243. Second angle 254 may also be referred to as a yaw of second baffle 243. Third angle 256 may be used to form an underpass with plurality of baffles 216. An underpass may allow some of airflow 214 to pass under second baffle 243. In some illustrative examples, an underpass may allow some of airflow 214 to pass under first baffle 235 and hit second baffle 243. In these illustrative examples, third angle 256 may be different from third angle 240. Wedge 248 may have v-shape 258. In some illustrative examples, second baffle 243 may be only portion 260 of wedge 248. When second baffle 243 is only portion 260 of wedge 248, second baffle 243 may include two separate planes of wedge 248. The two separate planes may not meet at a joint. When wedge 248 is complete, wedge 248 includes a joint between two sides.

At least one of height 250, first angle 252, second angle 254, or third angle 256 may be changed to vary flow characteristics 221 of air circulation 220. For example, changing at least one of height 250, first angle 252, second angle 254, or third angle 256 may change the characteristics of at least one of third stream 244 or fourth stream 245.

A value for at least one of height 250, first angle 252, second angle 254, or third angle 256 is selected based on at least one of measurements of autoclave 204, measurements of a workpiece to be processed in autoclave 204, or desirable processing parameters for the workpiece. The workpiece may be number of workpieces 202.

In some illustrative examples, third baffle 262 has at least one of a different height, a different first angle, a different second angle, or a different third angle than first baffle 235 and second baffle 243. Third baffle 262 may form fifth stream 264 and sixth stream 265 from air hitting third baffle 262. For example, a portion of airflow 214 may reach third baffle 262 and be split into counter rotating flow pattern 218 including at least a portion of at least one of fifth stream 264 or sixth stream 265.

Counter rotating flow pattern 218 includes fifth stream 264 that rotates in fifth direction 266 and sixth stream 265 that rotates in sixth direction 268 in plurality of streams 227. In some illustrative examples, fifth direction 266 is counter to sixth direction 268. In other illustrative examples, fifth direction 266 may be substantially the same as first direction 230. In some illustrative examples, sixth direction 268 may be substantially the same as second direction 234.

Third baffle 262 of plurality of baffles 216 is wedge 270 having height 272, first angle 274, second angle 276, and third angle 278. Height 272 may be chosen to create an overpass with plurality of baffles 216. An overpass may allow some of airflow 214 to pass over at least one of second baffle 243 or first baffle 235 and hit third baffle 262. In some illustrative examples, an overpass may allow some of airflow 214 to pass over third baffle 262. In some illustrative examples, height 272 and height 250 may be substantially the same. In other illustrative examples, height 272 may be greater than at least one of height 250 or height 237. In these illustrative examples, a portion of airflow 214 may pass over at least one of first baffle 235 or second baffle 243 and hit third baffle 262.

First angle 274 may also be referred to as a pitch of third baffle 262. Second angle 276 may also be referred to as a yaw of third baffle 262. Third angle 278 may be used to form an underpass with plurality of baffles 216. An underpass may allow some of airflow 214 to pass under at least one of first baffle 235 or second baffle 243 and reach third baffle 262. Wedge 270 may have v-shape 280. In some illustrative examples, third baffle 262 may be only portion 282 of wedge 270. When third baffle 262 is only portion 282 of wedge 270, third baffle 262 may include two separate planes of wedge 270. The two separate planes may not meet at a joint. When wedge 270 is complete, wedge 270 includes a joint between two sides.

At least one of height 272, first angle 274, second angle 276, or third angle 278 may be changed to vary flow characteristics 221 of air circulation 220. For example, changing at least one of height 272, first angle 274, second angle 276, or third angle 278 may change the characteristics of at least one of fifth stream 264 or sixth stream 265.

A value for at least one of height 272, first angle 274, second angle 276, or third angle 278 is selected based on at least one of measurements of autoclave 204, measurements of a workpiece to be processed in autoclave 204, or desirable processing parameters for the workpiece. The workpiece may be number of workpieces 202.

Plurality of baffles 216 may be connected to ceiling 284 of autoclave 204. Plurality of baffles 216 may be connected to ceiling 284 using structural pads 286 and rails 288. Plurality of baffles 216 may be positioned in a line along ceiling 284 of autoclave 204. Plurality of baffles 216 may be positioned in a line along the length of autoclave 204.

Autoclave 204 may have additional features to affect air circulation 220. In some illustrative examples, autoclave 204 may also include diffuser plate 290. Diffuser plate 290 may be located relative to first end 205. Diffuser plate 290 may have a number of openings to influence flow characteristics 221 of air at first end 205. Diffuser plate 290 may control the movement of air through first end 205. For example, at least one of the size, shape, location, and number of openings in diffuser plate 290 may control at least one of the amount, direction, shape, or speed of air encountering first end 205.

In some illustrative examples, autoclave 204 may also include diffuser plate 292. Diffuser plate 292 may be optional, and may not be included in autoclave 204. Diffuser plate 292 may control the movement of air from door 213 into autoclave 204. Diffuser plate 292 may have a number of openings to influence flow characteristics 221 of air into autoclave 204. Diffuser plate 292 may control airflow 214 into autoclave 204. For example, at least one of the size, shape, location, and number of openings in diffuser plate 292 may control at least one of the amount, direction, shape, or speed of airflow 214.

In some illustrative examples, diffuser plate 292 may be a solid plate with a single large opening to direct airflow 214 towards plurality of baffles 216. A solid diffuser plate 292 with a single large opening may be used in illustrative examples where autoclave 204 has annulus 211. Annulus 211 may have a cross-sectional shape of at least one of an arc or a circle. Annulus 211 may run along at least one of ceiling 284 or floor 212 of autoclave 204. Diffuser plate 292 may focus supplied air 209 from annulus 211.

Plurality of baffles 216 may include any desirable number of baffles. Changing the number of baffles in plurality of baffles 216 may affect flow characteristics 221. For example, decreasing the number of baffles in plurality of baffles 216 may increase turbulence 222. The number of baffles in plurality of baffles 216 may be determined based on at least one of desired flow characteristics, the length of autoclave 204, characteristics of each of the baffles, or other desirable characteristics. In some illustrative examples, plurality of baffles 216 may include between 3 baffles and 10 baffles.

Plurality of baffles 216 may be formed of a material selected to withstand repeated heat and pressure cycles in autoclave 204. In some illustrative examples, plurality of baffles 216 may be formed of steel.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, diffuser plate 292 is optional. Although diffuser plate 292 is shown in FIG. 2, in some illustrative examples, diffuser plate 292 may not be present. Further, plurality of baffles 216 may include any desirable number of baffles. For example, plurality of baffles 216 may include between three and fifteen baffles. In some illustrative examples, plurality of baffles 216 may include first baffle 235, second baffle 243, third baffle 262, and additional baffles.

Yet further, the terms first baffle 235, second baffle 243, and third baffle 262 are not meant to be restrictive as to placement or relative order of the baffles in plurality of baffles 216. For example, first baffle 235 may not be the first baffle airflow 214 encounters in autoclave 204. First baffle 235 may not be the baffle positioned closest to second end 206 of autoclave 204. As another example, second baffle 243 may not be the second baffle airflow 214 encounters in autoclave 204. Second baffle 243 may not be the second closest baffle to second end 206 of autoclave 204. Yet further, in some illustrative examples, first baffle 235 may not encounter airflow 214 prior to second baffle 243. As yet another example, third baffle 262 may not be the third baffle airflow 214 encounters in autoclave 204. Third baffle 262 may not be the third closest baffle to second end 206 of autoclave 204.

Figure 3:
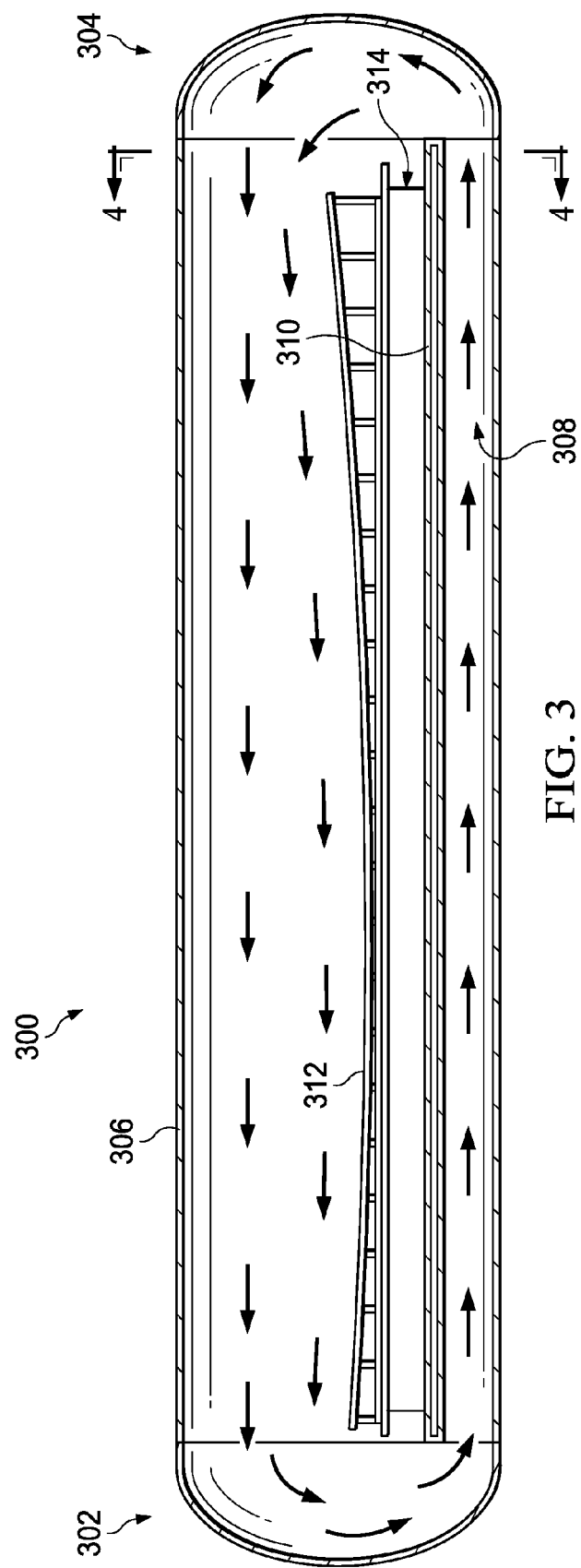
FIG. 3 is an illustration of a cross-section of an autoclave with a number of workpieces in accordance with an illustrative embodiment.

Turning now to FIG. 3, an illustration of a cross-section of an autoclave with a number of workpieces is depicted in accordance with an illustrative embodiment. Autoclave 300 may be a physical implementation of autoclave 204 shown in block form in FIG. 2. As depicted, autoclave 300 does not have any baffles. Autoclave 300 has first end 302, second end 304, ceiling 306, and conduit 308 in floor 310. Number of workpieces 312 is positioned on platform 314 within autoclave 300.

Figure 4:
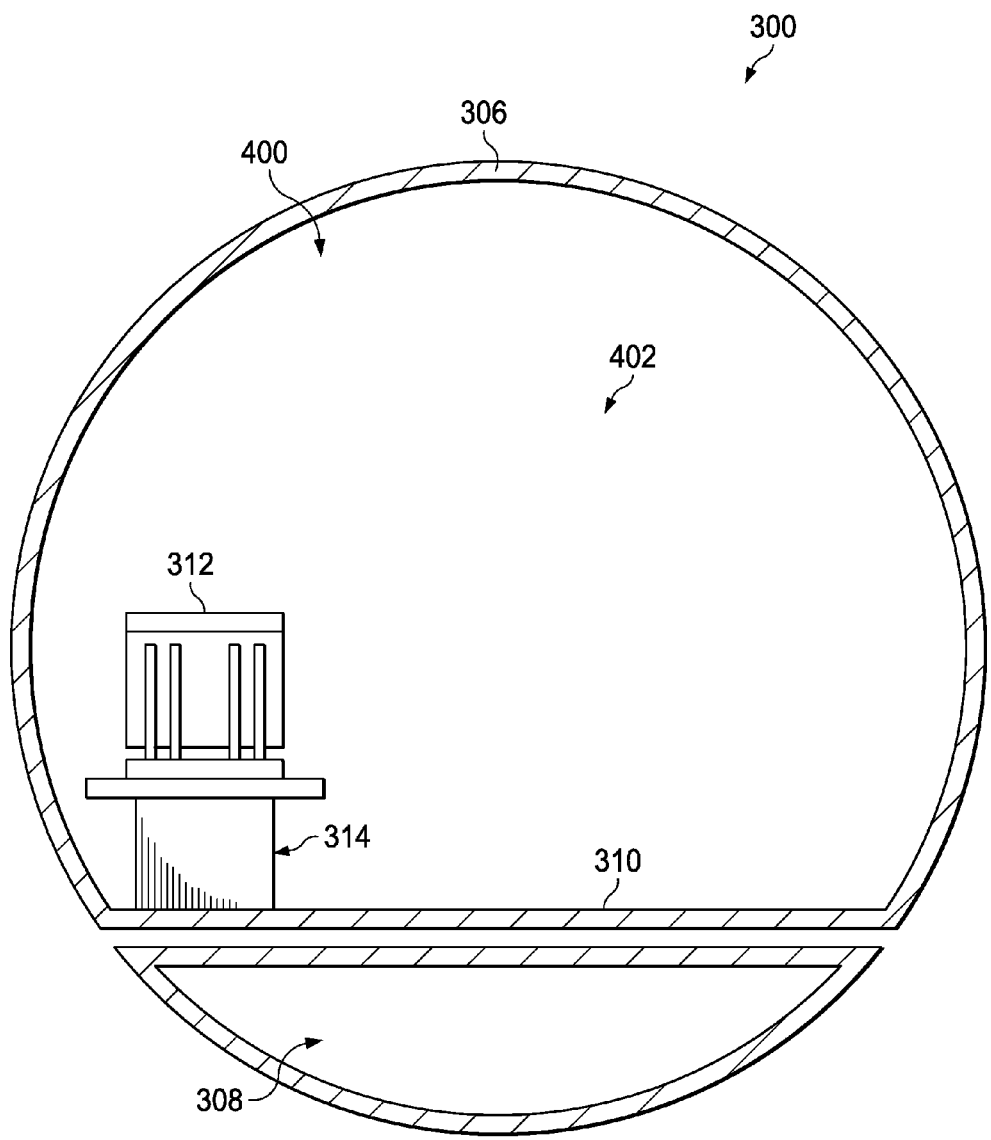
FIG. 4 is an illustration of a front cross-section of an autoclave with a number of workpieces in accordance with an illustrative embodiment.

Turning now to FIG. 4, an illustration of a front cross-section of an autoclave with a number of workpieces is depicted in accordance with an illustrative embodiment. A cross-section of autoclave 300 is shown taken in the direction of 3-3 from second end 304 of FIG. 3. As depicted in FIG. 4, autoclave 300 has cross-sectional area 400 that is circular segment 402. Circular segment 402 is a portion of a circle. Conduit 308 is also a circular segment.

Figure 5:
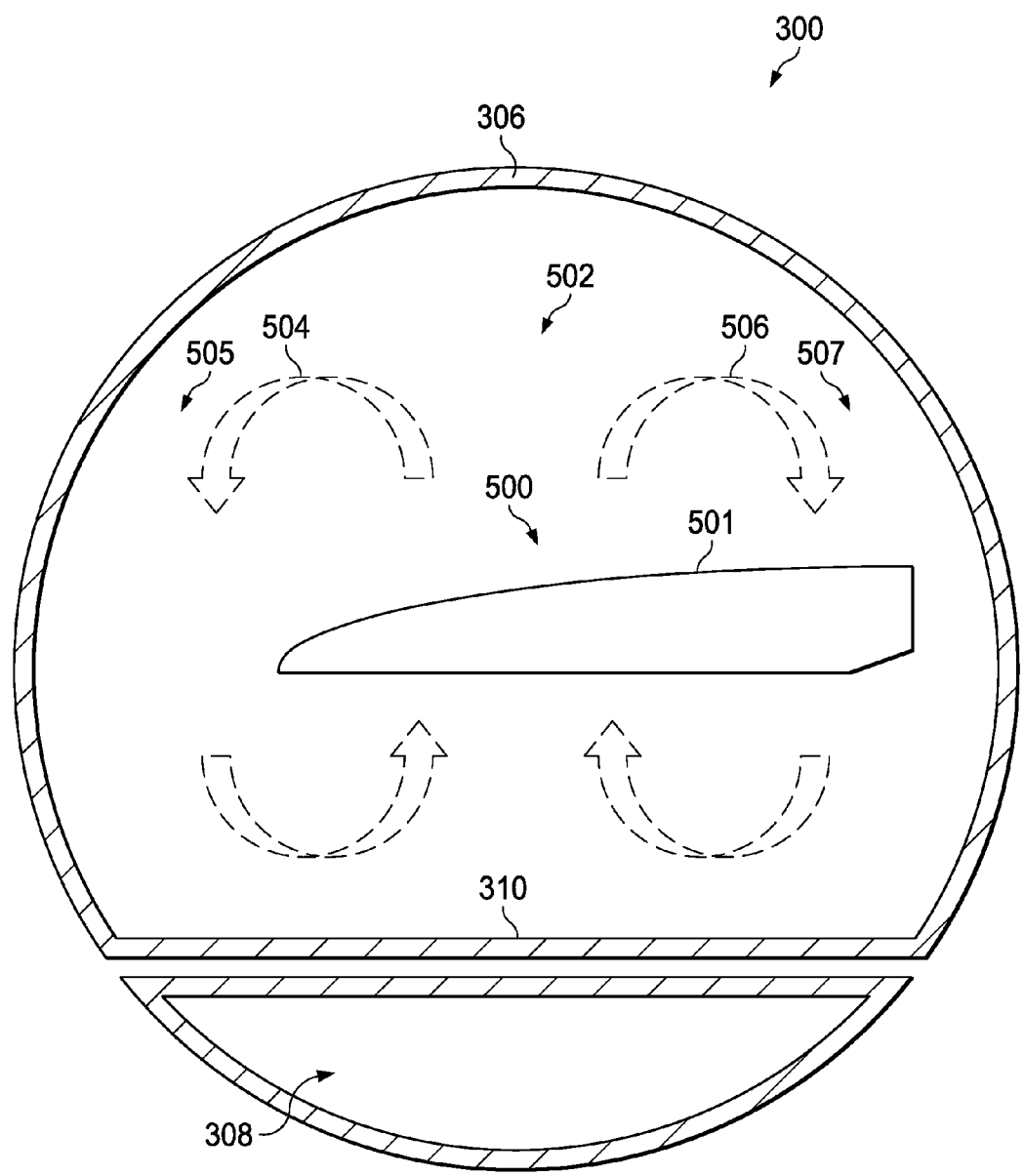
FIG. 5 is an illustration of a front cross-section of an autoclave with a number of workpieces and a counter-rotating flow in accordance with an illustrative embodiment.

Turning now to FIG. 5, an illustration of a front cross-section of an autoclave with a number of workpieces and a counter-rotating flow is depicted in accordance with an illustrative embodiment. A cross-section of autoclave 300 with number of workpieces 500 is shown taken in the direction of 3-3 from second end 304 of FIG. 3. As depicted, number of workpieces 500 takes the form of wing 501. Wing

501 is different from number of workpieces 312 depicted in FIG. 3. A plurality of baffles is not depicted for clarity.

Counter-rotating flow 502 may be desirable air circulation for autoclave 300 containing wing 501. As depicted, counter-rotating flow 502 includes first stream 504 moving in first direction 505 and second stream 506 moving in second direction 507. Counter-rotating flow 502 may increase turbulence within autoclave 300. Counter-rotating flow 502 may also cause desirable air circulation below wing 501.

Although not depicted in FIG. 5, a plurality of baffles, such as plurality of baffles 216, forms counter-rotating flow 502. At least one of a height of a baffle, a shape of a baffle, an angle of a baffle, a number of baffles, a position of baffles, or other features of the plurality of baffles may control counter-rotating flow 502.

Figure 6:
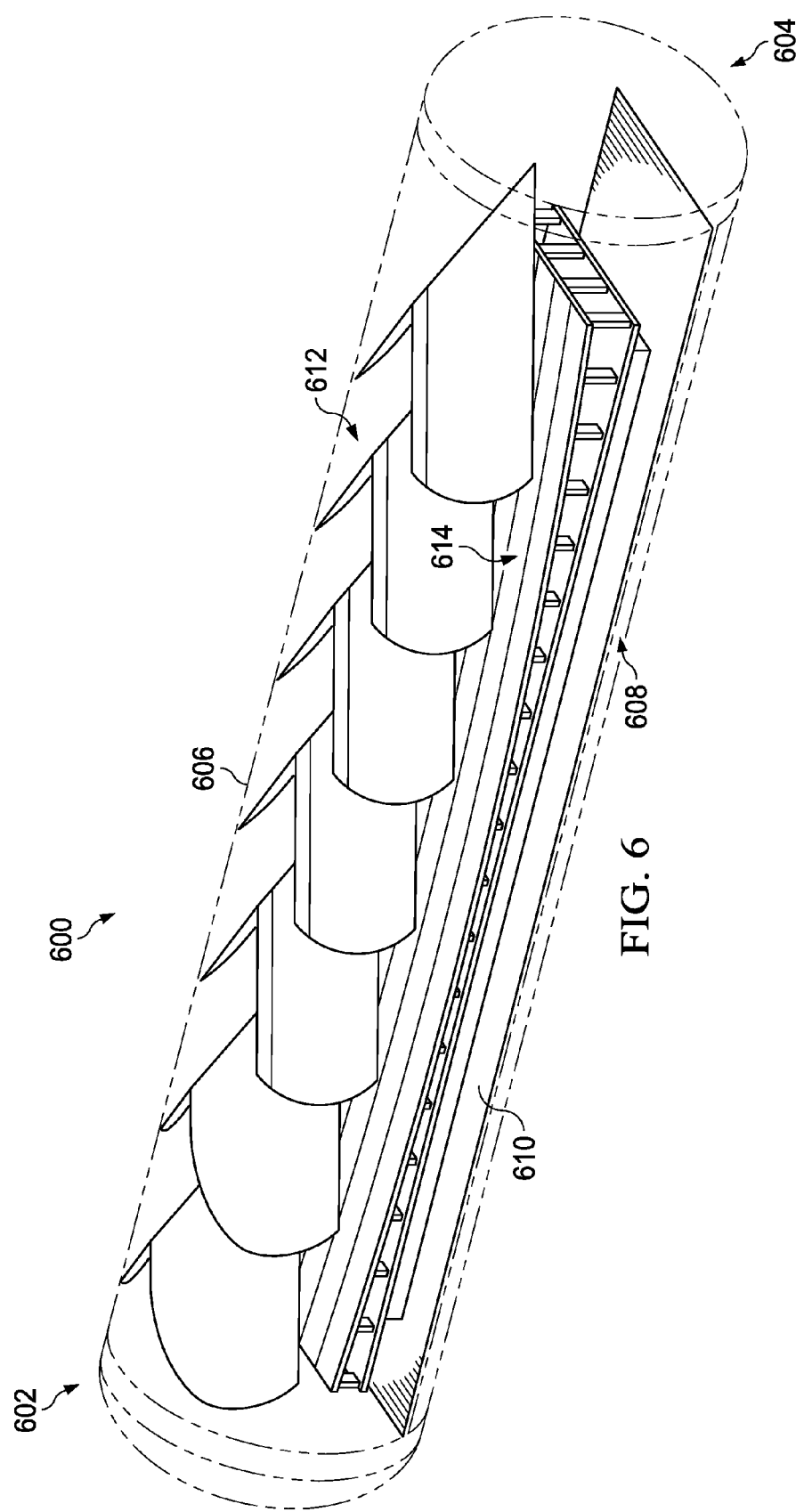
FIG. 6 is an illustration of an isometric view of an autoclave with an implementation of a plurality of baffles in accordance with an illustrative embodiment.

Turning now to FIG. 6, an illustration of an isometric view of an autoclave with an implementation of a plurality of baffles is depicted in accordance with an illustrative embodiment. Autoclave 600 may be a physical implementation of autoclave 204 shown in block form in FIG. 2. As depicted, autoclave 600 has first end 602, second end 604, ceiling 606, and conduit 608 in floor 610. Autoclave 600 contains plurality of baffles 612. As depicted, plurality of baffles 612 includes seven baffles. As depicted, each baffle of plurality of baffles 612 is a V-shaped wedge. Number of workpieces 614 is positioned below plurality of baffles 612 within autoclave 600.

Turning now to FIG. 7, an illustration of a side cross-sectional view of an autoclave with an implementation of a plurality of baffles is depicted in accordance with an illustrative embodiment. Plurality of baffles 612 in autoclave 600 includes first baffle 700, second baffle 702, and third baffle 704. First baffle 700 has first angle 706 and height 708. Second baffle 702 has height 709 and first angle 710. Third baffle 704 has first angle 712 and height 714.

As depicted, first angle 706, first angle 710, and first angle 712 are substantially the same. First angle 706, first angle 710, and first angle 712 are the pitch measurements of each of first baffle 700, second baffle 702, and third baffle 704, respectively. Although each of plurality of baffles 612, as depicted, has substantially the same pitch, in some illustrative examples, at least one pitch of plurality of baffles 612 may be different from at least one of the remaining first angles of plurality of baffles 612. In some illustrative examples, at least one of first angle 706, first angle 710, or first angle 712 may be different from at least one of the remaining first angles of plurality of baffles 612.

The value of each of first angle 706, first angle 710, and first angle 712 may be selected from within the range of about 20 degrees to about 40 degrees. As depicted, first angle 706, first angle 710, and first angle 712 may be approximately 25 degrees.

Height 708 of first baffle 700 and height 709 of second baffle 702 are substantially the same. Height 708 and height 709 form overpass 716. At least a portion of airflow reflected from second end 604 may pass over first baffle 700 and second baffle 702 using overpass 716. The portion of the airflow traveling through overpass 716 may encounter third baffle 704. Third baffle 704 may split the portion of the airflow into a counter-rotating flow.

Overpass 716 may have height 718. Height 718 may be any desirable value. In some illustrative examples, height 718 may be in the range of about 0 feet to about 6 feet. In some illustrative examples, height 718 may be in the range of about 1 foot to about 3 feet.

Turning now to FIG. 8, an illustration of a top cross-sectional view of an autoclave with an implementation of a plurality of baffles is depicted in accordance with an illustrative embodiment. FIG. 8 is a top cross-sectional view of autoclave 600 of FIG. 6.

As depicted, each of plurality of baffles 612 is a V-shaped wedge. First baffle 700 has second angle 800. Second baffle 702 has second angle 802. Third baffle 704 has second angle 804. As depicted, each of second angle 800, second angle 802, and second angle 804 is substantially the same.

Second angle 800, second angle 802, and second angle 804 are the yaw measurements of each of first baffle 700, second baffle 702, and third baffle 704, respectively. Although each of plurality of baffles 612, as depicted, has substantially the same yaw, in some illustrative examples, at least one second angle of plurality of baffles 612 may be different from at least one of the remaining second angles of plurality of baffles 612. In some illustrative examples, at least one of second angle 800, second angle 802, or second angle 804 may be different from at least one of the remaining second angles of plurality of baffles 612.

The value of each of second angle 800, second angle 802, and second angle 804 may be selected from within the range of about 20 degrees to about 40 degrees. As depicted, second angle 800, second angle 802, or second angle 804 may be approximately 40 degrees.

Figure 9:
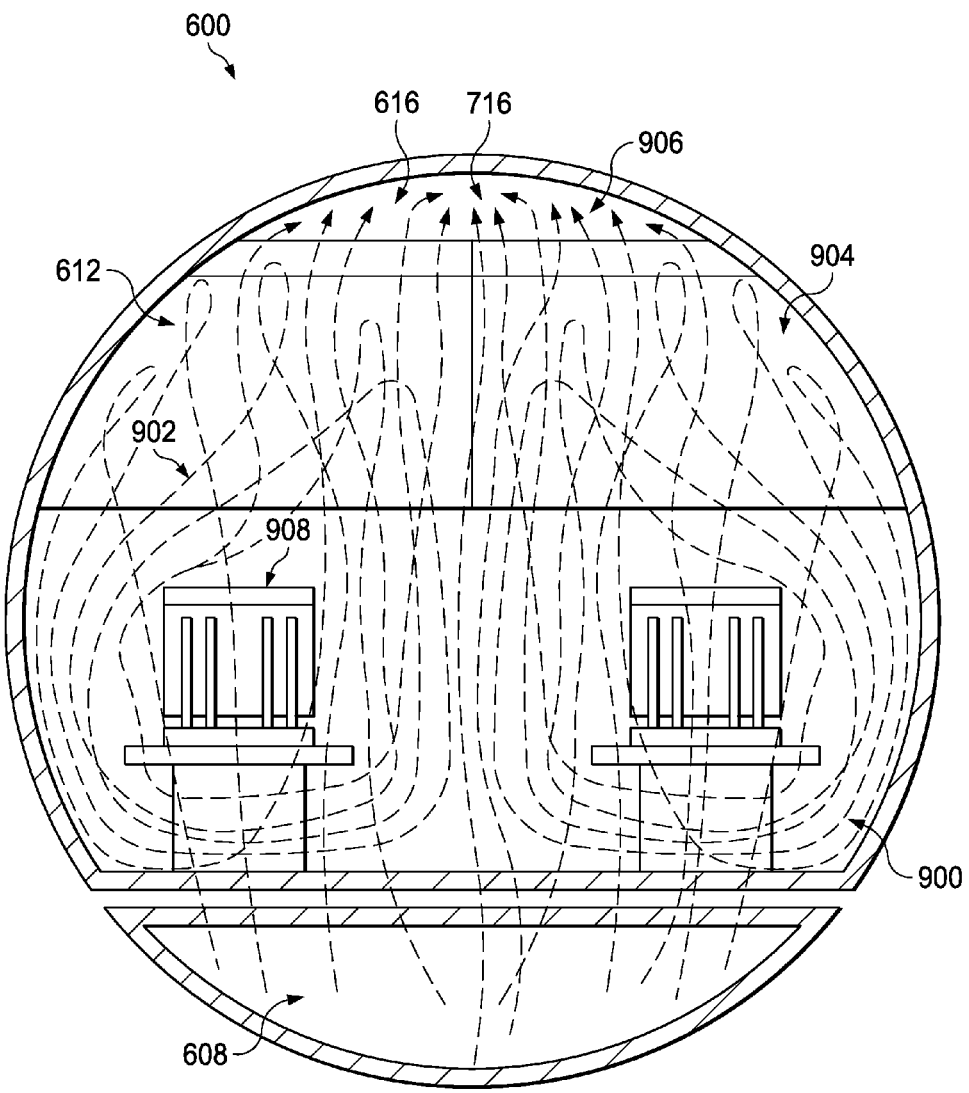
FIG. 9 is an illustration of a front view of an autoclave with an implementation of a plurality of baffles and examples of air streamlines in accordance with an illustrative embodiment.

Turning now to FIG. 9, an illustration of a front view of an autoclave with an implementation of a plurality of baffles and examples of air streamlines is depicted in accordance with an illustrative embodiment. For demonstrative purposes, second end 604 of autoclave 600 is transparent. As depicted, autoclave 600 has plurality of baffles 612 that create counter-rotating flow 900. Air streamlines 902 depict airflow 904 ricocheting off second end 604 (not depicted), counter-rotating flow 900, and air 906 flowing through overpass 716.

Air streamlines 902 are only a single non-limiting example of air circulation within autoclave 600 with plurality of baffles 612. Air streamlines 902 may change based on the type, size, and locations of number of workpieces 908 within autoclave 600. Air streamlines 902 may change based on the number, height, first angle, second angle, or position of plurality of baffles 612. Air streamlines 902 may change based on the length, height, or cross-sectional area of autoclave 600.

Figure 10:
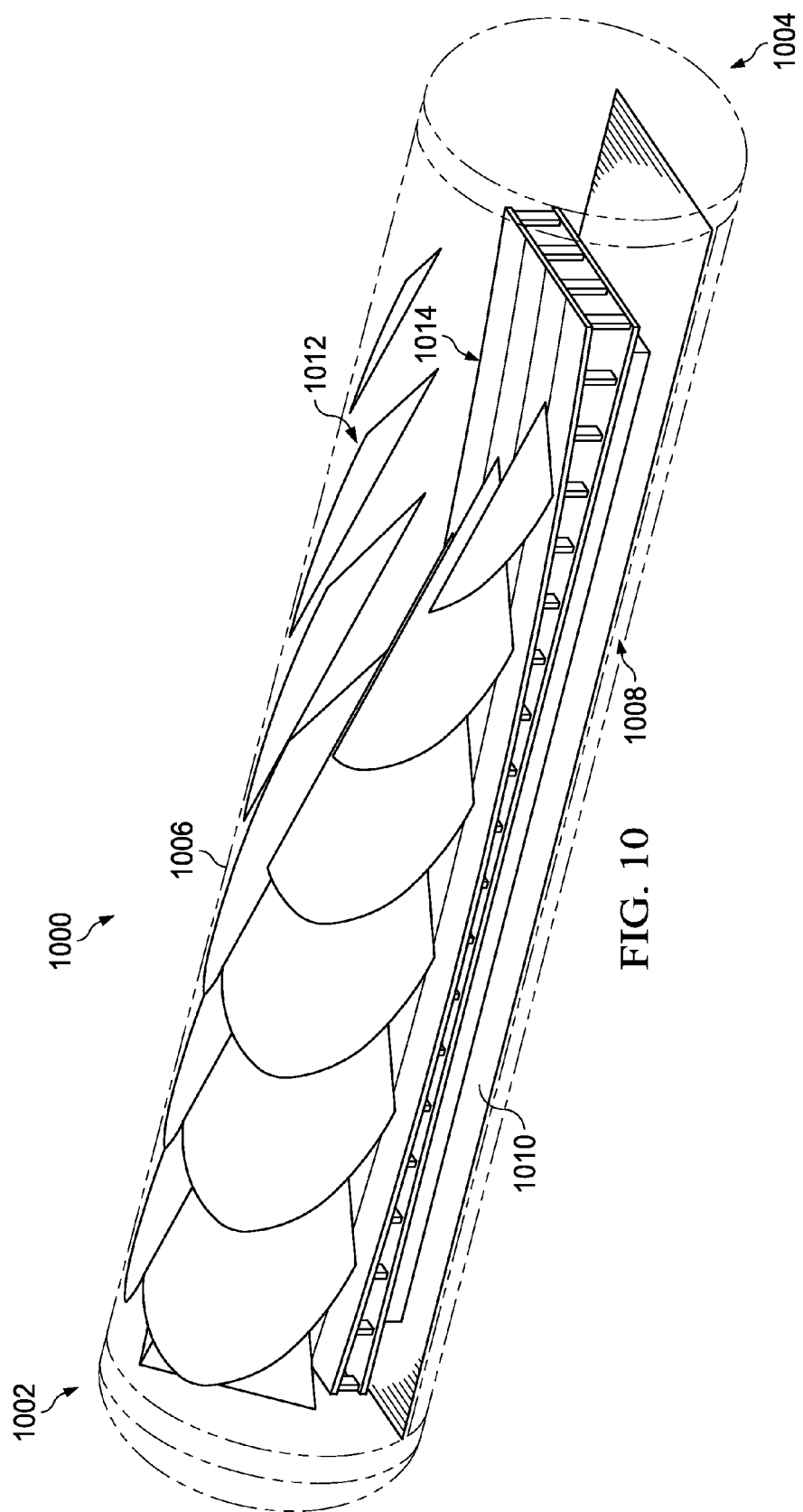
FIG. 10 is an illustration of an isometric view of an autoclave with an implementation of a plurality of baffles in accordance with an illustrative embodiment.

Turning now to FIG. 10, an illustration of an isometric view of an autoclave with an implementation of a plurality of baffles is depicted in accordance with an illustrative embodiment. Autoclave 1000 may be a physical implementation of autoclave 204 shown in block form in FIG. 2. As depicted, autoclave 1000 has first end 1002, second end 1004, ceiling 1006, and conduit 1008 in floor 1010. Autoclave 1000 contains plurality of baffles 1012. As depicted, plurality of baffles 1012 includes seven baffles. As depicted, some of plurality of baffles 1012 are V-shaped wedges and some of plurality of baffles 1012 are only partial V-shaped wedges. Number of workpieces 1014 is positioned below plurality of baffles 1012 within autoclave 1000.

Turning now to FIG. 11, an illustration of a cross-sectional view of an autoclave with an implementation of a plurality of baffles is depicted in accordance with an illustrative embodiment. Plurality of baffles 1012 in autoclave 1000 includes first baffle 1100, second baffle 1102, and third baffle 1104. First baffle 1100 has first angle 1106 and height 1108. Second baffle 1102 has height 1109 and first angle 1110. Third baffle 1104 has first angle 1112 and height 1114.

As depicted, first angle 1106, first angle 1110, and first angle 1112 are substantially the same. First angle 1106, first angle 1110, and first angle 1112 are the pitch measurements of each of first baffle 1100, second baffle 1102, and third baffle 1104, respectively. Although each of plurality of baffles 1012, as depicted, has substantially the same pitch, in some illustrative examples, at least one pitch of plurality of baffles 1012 may be different from at least one of the remaining first angles of plurality of baffles 1012. In some illustrative examples, at least one of first angle 1106, first angle 1110, or first angle 1112 may be different from at least one of the remaining first angles of plurality of baffles 1012.

The value of each of first angle 1106, first angle 1110, and first angle 1112 may be selected from within the range of about 20 degrees to about 40 degrees. As depicted, first angle 1106, first angle 1110, and first angle 1112 may be approximately 25 degrees.

Height 1108 of first baffle 1100 and height 1109 of second baffle 1102 are different. Height 1108 and height 1109 may be different as first baffle 1100 is a front portion of second baffle 1102. Each of height 1108 and height 1109 form overpass 1116. At least a portion of airflow reflected from second end 1004 may pass over first baffle 1100 using overpass 1116. Some air passing over first baffle 1100 using overpass 1116 may encounter second baffle 1102. At least a portion of airflow reflected from second end 1004 may pass over first baffle 1100 and second baffle 1102 using overpass 1116. The portion of the airflow traveling through overpass 1116 over second baffle 1102 may encounter third baffle 1104. Second baffle 1102 may be a front portion of third baffle 1104. Third baffle 1104 may split the portion of the airflow into a counter-rotating flow.

Overpass 1116 may have a varying height. The varying height may be any desirable values. In some illustrative examples, the varying height may be in the range of about 0 feet to about 6 feet. In some illustrative examples, the varying height may be in the range of about 0 feet to about 3 feet. The varying height of overpass 1116 may be created by a variety of heights in plurality of baffles 1012.

Turning now to FIG. 12, an illustration of a top cross-sectional view of an autoclave with an implementation of a plurality of baffles is depicted in accordance with an illustrative embodiment. FIG. 12 is a top cross-sectional view of autoclave 1000 of FIG. 10.

As depicted, each of plurality of baffles 1012 is a V-shaped wedge. First baffle 1100 has second angle 1200. Second baffle 1102 has second angle 1202. Third baffle 1104 has second angle 1204. As depicted, each of second angle 1200, second angle 1202, and second angle 1204 is substantially the same.

Second angle 1200, second angle 1202, and second angle 1204 are the yaw measurements of each of first baffle 1100, second baffle 1102, and third baffle 1104 respectively. Although each of plurality of baffles 1012, as depicted, has substantially the same yaw, in some illustrative examples, at least one second angle of plurality of baffles 1012 may be different from at least one of the remaining second angles of plurality of baffles 1012. In some illustrative examples, at least one of second angle 1200, second angle 1202, or second angle 1204 may be different from at least one of the remaining second angles of plurality of baffles 1012.

The value of each of second angle 1200, second angle 1202, and second angle 1204 may be selected from within the range of about 20 degrees to about 40 degrees. As depicted, second angle 1200, second angle 1202, or second angle 1204 may be approximately 40 degrees.

As can be seen in FIG. 12, first baffle 1100 has two separated sides. Air may flow between the two sides of first baffle 1100 to encounter at least one of second baffle 1102 or third baffle 1103. First baffle 1100 may be substantially the same as a front portion of second baffle 1102. Second baffle 1102 may be substantially the same as a front portion of third baffle 1103.

Figure 13:
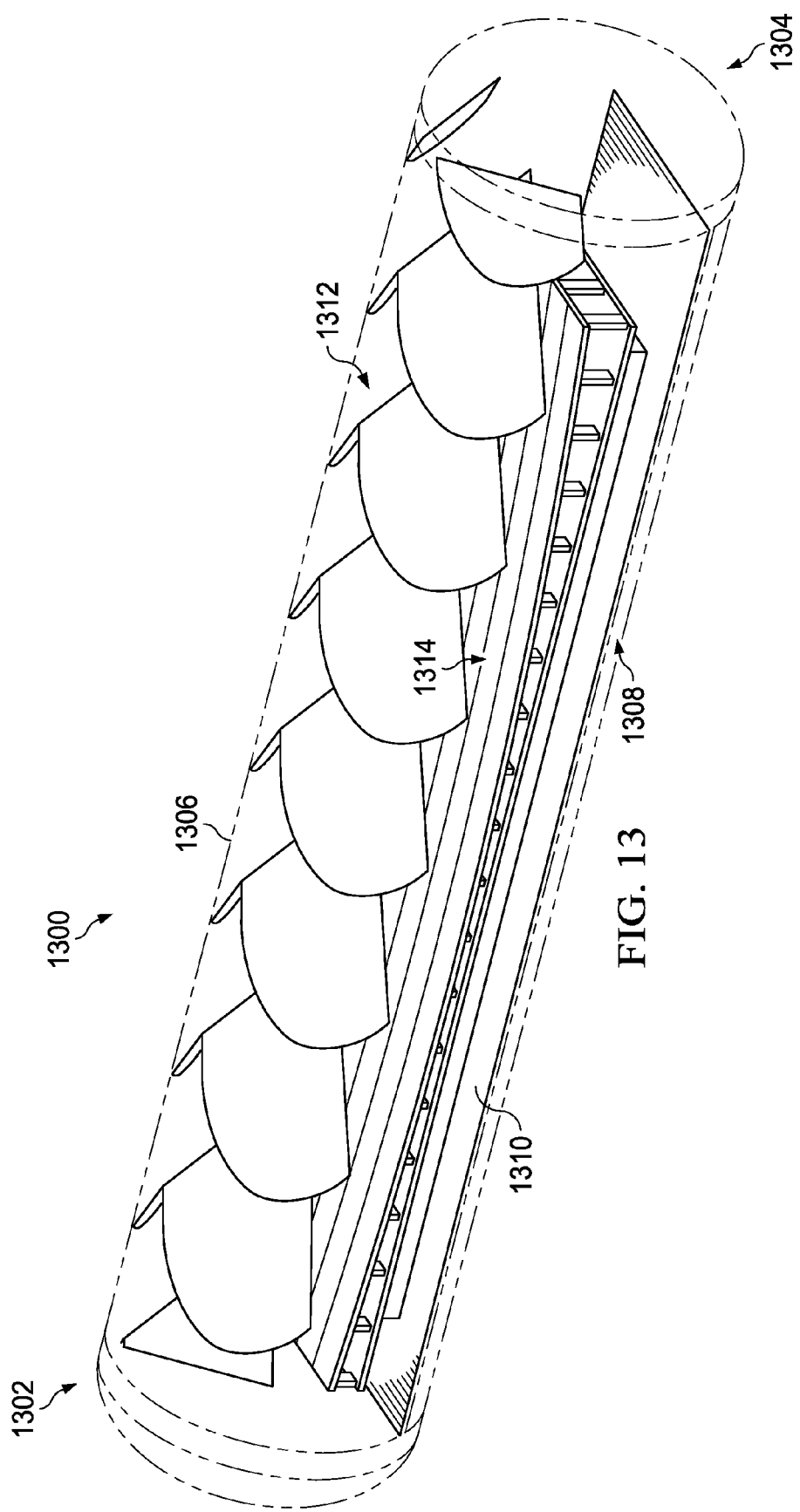
FIG. 13 is an illustration of an isometric view of an autoclave with an implementation of a plurality of baffles in accordance with an illustrative embodiment.

Turning now to FIG. 13, an illustration of an isometric view of an autoclave with an implementation of a plurality of baffles is depicted in accordance with an illustrative embodiment. Autoclave 1300 may be a physical implementation of autoclave 204 shown in block form in FIG. 2. As depicted, autoclave 1300 has first end 1302, second end 1304, ceiling 1306, and conduit 1308 in floor 1310. Autoclave 1300 contains plurality of baffles 1312. As depicted, plurality of baffles 1312 includes nine baffles. As depicted, some of plurality of baffles 1312 are V-shaped wedges and some of plurality of baffles 1312 are only partial V-shaped wedges. Number of workpieces 1314 is positioned below plurality of baffles 1312 within autoclave 1300.

Figure 14:
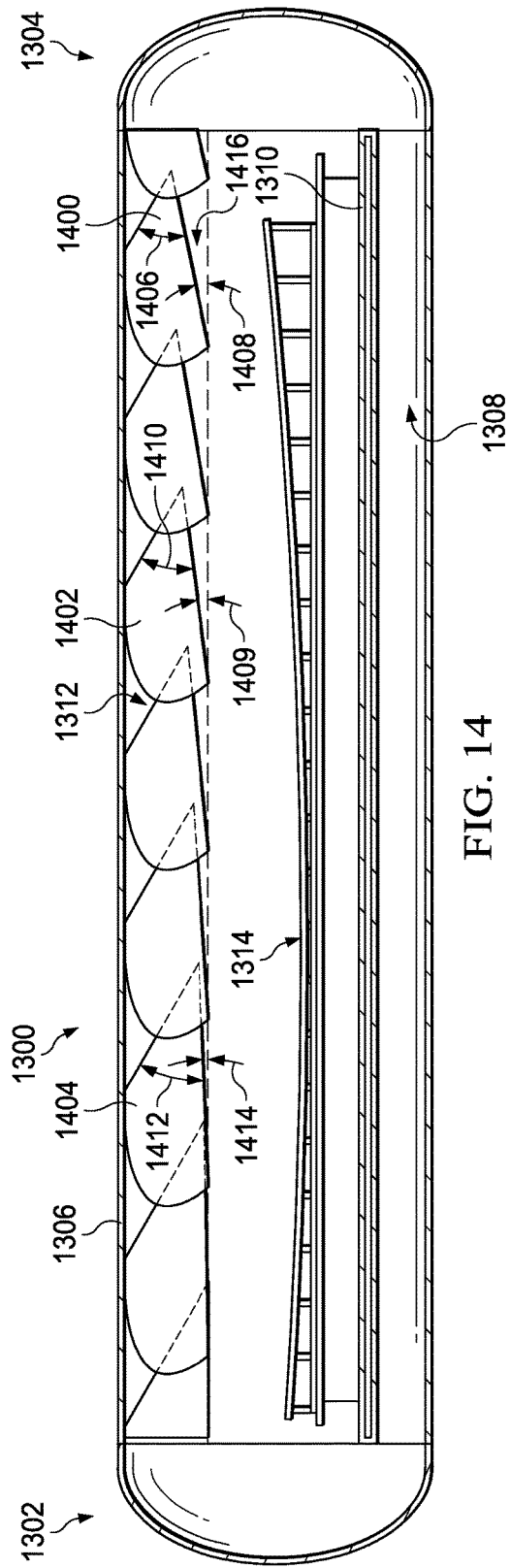
FIG. 14 is an illustration of a cross-sectional view of an autoclave with an implementation of a plurality of baffles in accordance with an illustrative embodiment.

Turning now to FIG. 14, an illustration of a cross-sectional view of an autoclave with an implementation of a plurality of baffles is depicted in accordance with an illustrative embodiment. FIG. 14 is a cross-sectional view of autoclave 1300 of FIG. 13.

Plurality of baffles 1312 in autoclave 1300 includes first baffle 1400, second baffle 1402, and third baffle 1404. First baffle 1400 has first angle 1406 and third angle 1408. Second baffle 1402 has third angle 1409 and first angle 1410. Third baffle 1404 has first angle 1412 and third angle 1414.

As depicted, first angle 1406, first angle 1410, and first angle 1412 are substantially the same. First angle 1406, first angle 1410, and first angle 1412 are the pitch measurements of each of first baffle 1400, second baffle 1402, and third baffle 1404, respectively. Although each of plurality of baffles 1312, as depicted, has substantially the same pitch, in some illustrative examples, at least one pitch of plurality of baffles 1312 may be different from at least one of the remaining first angles of plurality of baffles 1312. In some illustrative examples, at least one of first angle 1406, first angle 1410, or first angle 1412 may be different from at least one of the remaining first angles of plurality of baffles 1312.

The value of each of first angle 1406, first angle 1410, and first angle 1412 may be selected from within the range of about 20 degrees to about 40 degrees. As depicted, first angle 1406, first angle 1410, and first angle 1412 may be approximately 25 degrees.

Each of third angle 1408 of first baffle 1400, third angle 1409 of second baffle 1402, and third angle 1414 of third baffle 1403 are different. Third angle 1408, third angle 1409, and third angle 1414 contribute to form underpass 1416. At least a portion of airflow reflected from second end 1304 may pass under first baffle 1400 using underpass 1416. Some air passing under first baffle 1400 using underpass 1416 may encounter second baffle 1402. At least a portion of airflow reflected from second end 1304 may pass under first baffle 1400 and second baffle 1402 using underpass 1416. The portion of the airflow traveling under second baffle 1402 may encounter third baffle 1404. Third baffle 1404 may split the portion of the airflow into a counter-rotating flow.

Underpass 1416 may be formed by varying third angles of plurality of baffles 1312. The varying third angle may be any desirable values. In some illustrative examples, the varying third angle may be in the range of about zero to about thirty degrees.

Figure 15:
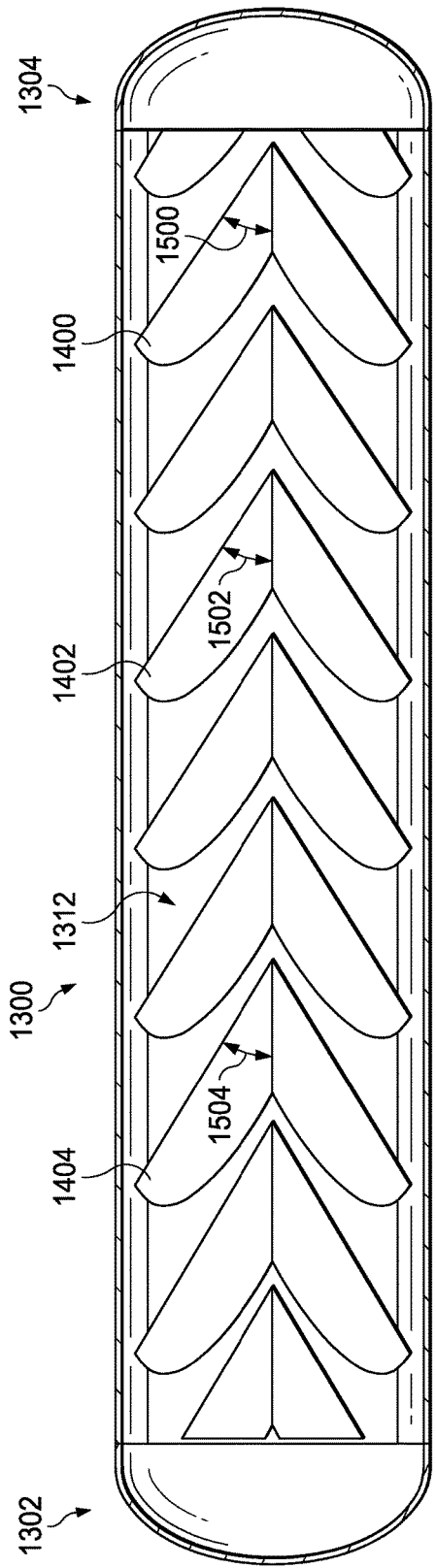
FIG. 15 is an illustration of a top cross-sectional view of an autoclave with an implementation of a plurality of baffles in accordance with an illustrative embodiment.

Turning now to FIG. 15, an illustration of a top cross-sectional view of an autoclave with an implementation of a plurality of baffles is depicted in accordance with an illustrative embodiment. FIG. 15 is a top cross-sectional view of autoclave 1300 of FIG. 13.

As depicted, each of plurality of baffles 1312 is a V-shaped wedge. First baffle 1400 has second angle 1500. Second baffle 1402 has second angle 1502. Third baffle 1404 has second angle 1504. As depicted, each of second angle 1500, second angle 1502, and second angle 1504 is substantially the same.

Second angle 1500, second angle 1502, and second angle 1504 are the yaw measurements of each of first baffle 1400, second baffle 1402, and third baffle 1404, respectively. Although each of plurality of baffles 1312, as depicted, has substantially the same yaw, in some illustrative examples, at least one second angle of plurality of baffles 1312 may be different from at least one of the remaining second angles of plurality of baffles 1312. In some illustrative examples, at least one of second angle 1500, second angle 1502, or second angle 1504 may be different from at least one of the remaining second angles of plurality of baffles 1312.

The value of each of second angle 1500, second angle 1502, and second angle 1504 may be selected from within the range of about 20 degrees to about 40 degrees. As depicted, second angle 1500, second angle 1502, or second angle 1504 may be approximately 40 degrees.

Figure 16:
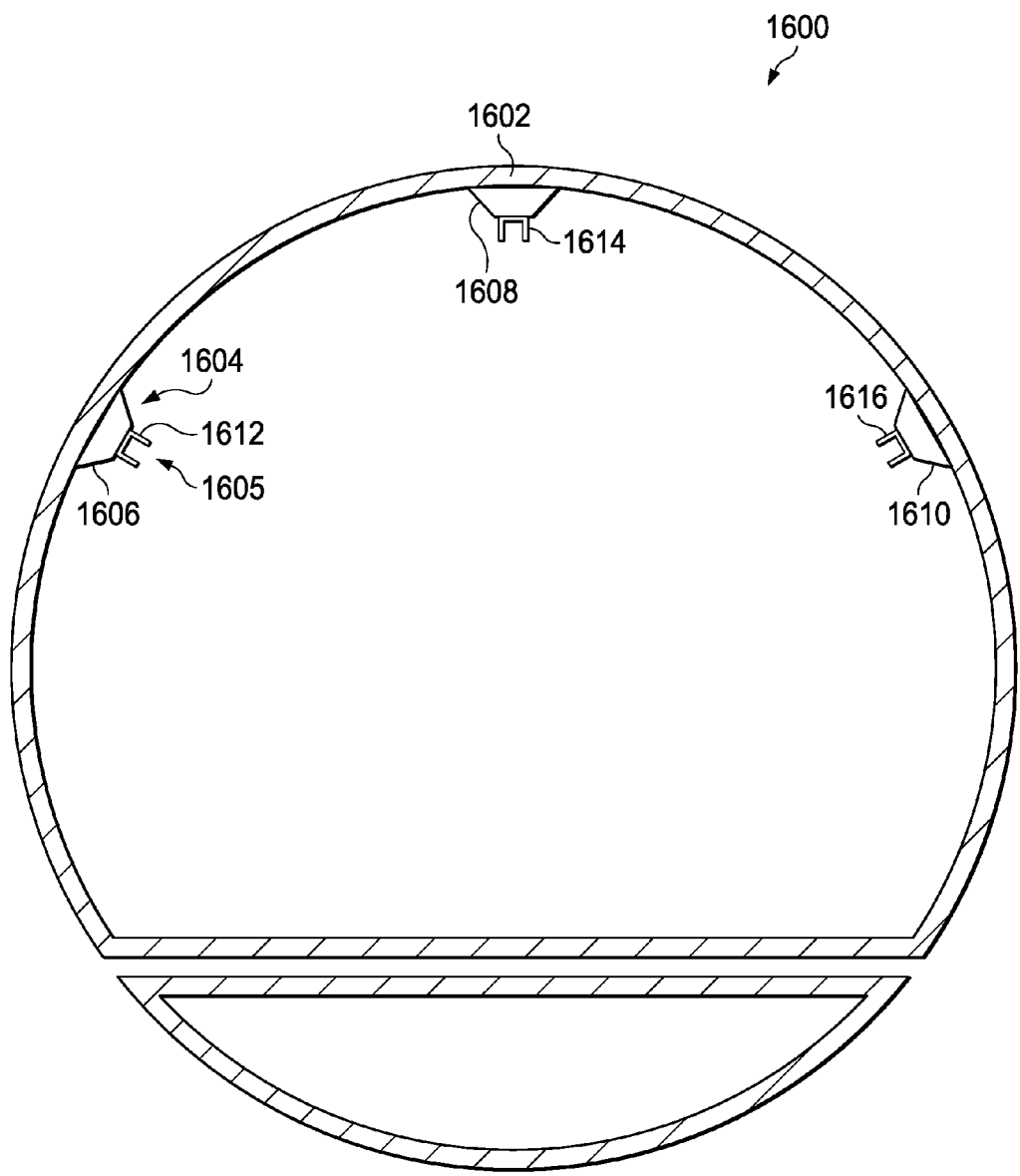
FIG. 16 is an illustration of a front cross-sectional view of an autoclave with connection points in accordance with an illustrative embodiment.

Turning now to FIG. 16, an illustration of a front cross-sectional view of an autoclave with connection points is depicted in accordance with an illustrative embodiment. Autoclave 1600 may be a physical implementation of autoclave 204 shown in block form in FIG. 2. As depicted, autoclave 1600 has ceiling 1602. A plurality of baffles may be attached to ceiling 1602 of autoclave 1600 using structural pads 1604 and rails 1605. Structural pads 1604 include structural pads 1606, structural pads 1608, and structural pads 1610. Structural pads 1606 may secure rail 1612 to ceiling 1602 of autoclave 1600. Structural pads 1608 may secure rail 1614 to ceiling 1602 of autoclave 1600. Structural pads 1610 may secure rail 1616 to ceiling 1602 of autoclave 1600.

Structural pads 1604 may be directly secured to ceiling 1602 using a desirable method. It may be undesirable to drill holes into or otherwise remove material from autoclave 1600. Structural pads 1604 may take the form of steel pads welded to ceiling 1602 of autoclave 1600.

Figure 17:
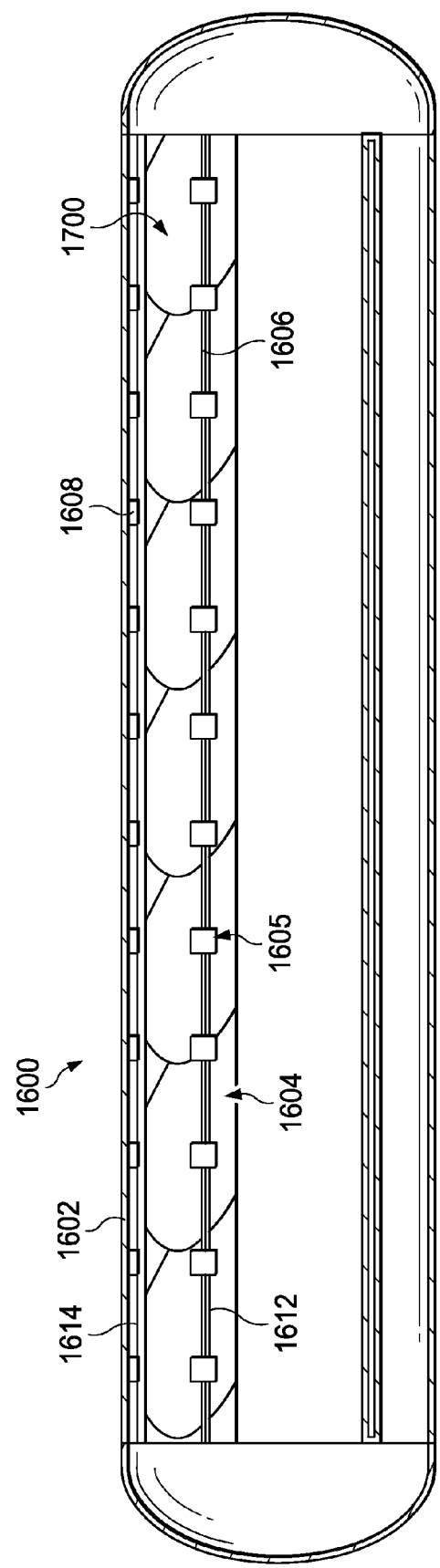
FIG. 17 is an illustration of a side cross-sectional view of an autoclave with connection points in accordance with an illustrative embodiment.

Turning now to FIG. 17, an illustration of a side cross-sectional view of an autoclave with connection points is depicted in accordance with an illustrative embodiment. FIG. 17 provides an illustration of plurality of baffles 1700 that may be connected to ceiling 1602 of autoclave 1600 using structural pads 1604 and at least one of rail 1612, rail 1614, and rail 1616. FIG. 17 is only one implementation of a plurality of baffles that may be connected to autoclave 1600.

Figure 18:
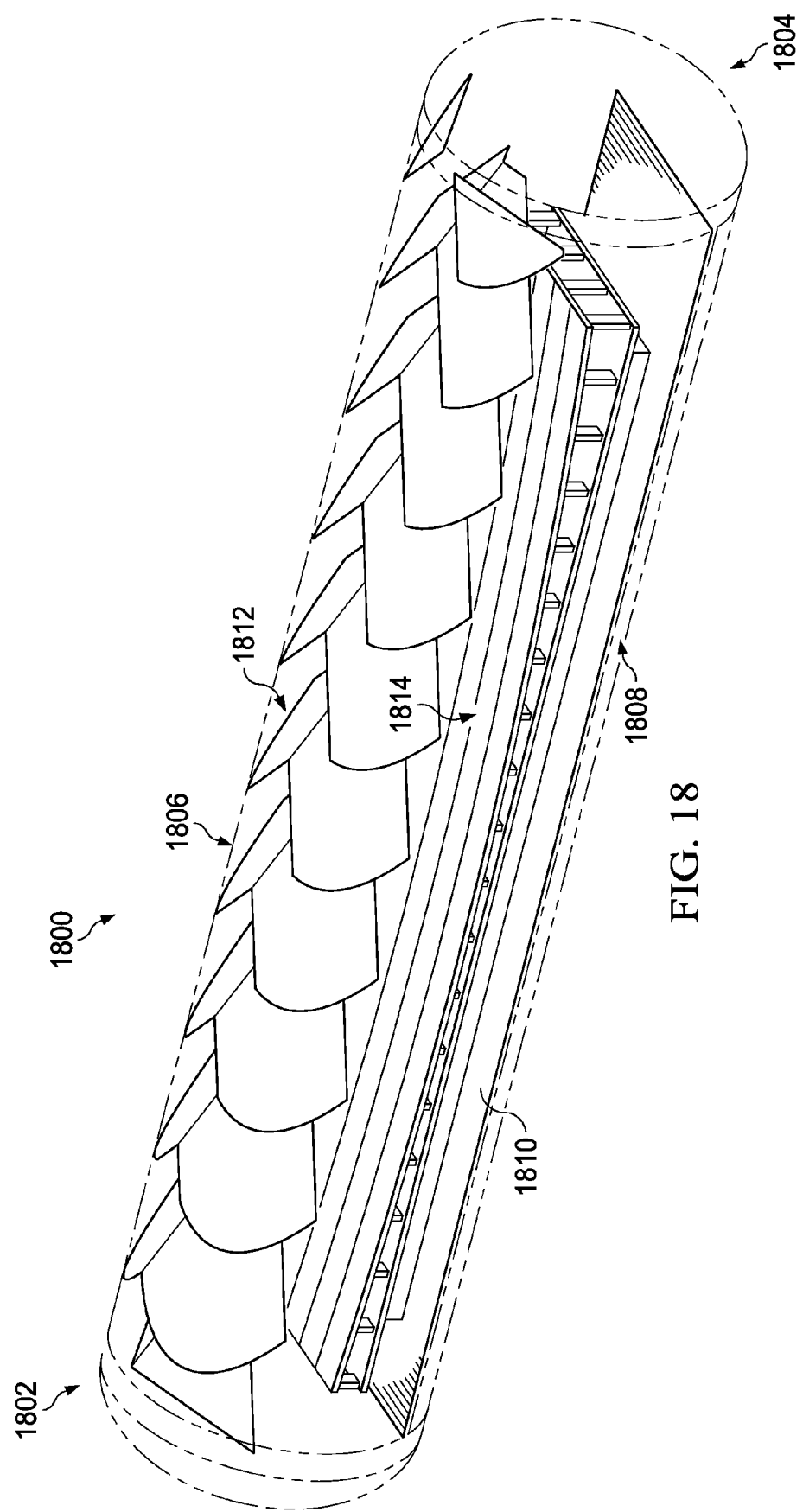
FIG. 18 is an illustration of a top cross-sectional view of an autoclave with an implementation of a plurality of baffles in accordance with an illustrative embodiment.

Turning now to FIG. 18, an illustration of an isometric view of an autoclave with an implementation of a plurality of baffles is depicted in accordance with an illustrative embodiment. Autoclave 1800 may be a physical implementation of autoclave 204 shown in block form in FIG. 2. As depicted, autoclave 1800 has first end 1802, second end 1804, ceiling 1806, and conduit 1808 in floor 1810. Autoclave 1800 contains plurality of baffles 1812. As depicted, plurality of baffles 1812 includes nine baffles. As depicted, some of plurality of baffles 1812 are V-shaped wedges and some of plurality of baffles 1812 are only partial V-shaped wedges. Number of workpieces 1814 is positioned below plurality of baffles 1812 within autoclave 1800.

Turning now to FIG. 19, an illustration of a cross-sectional view of an autoclave with an implementation of a plurality of baffles is depicted in accordance with an illustrative embodiment. FIG. 19 is a cross-sectional view of autoclave 1800 of FIG. 18.

Plurality of baffles 1812 in autoclave 1800 includes first baffle 1900, second baffle 1902, third baffle 1904, fourth baffle 1906, fifth baffle 1908, and sixth baffle 1910. As depicted, first baffle 1900 is a partial wedge. First baffle 1900 has height 1912. Second baffle 1902 has first angle 1914 and height 1916. Third baffle 1904 has first angle 1918 and height 1920. Fourth baffle 1906 has height 1922. Fifth baffle 1908 has first angle 1924 and height 1926. Sixth baffle 1910 is a partial wedge.

As depicted, first angle 1914, first angle 1918 and first angle 1924 are substantially the same. First angle 1914, first angle 1918, and first angle 1924 are the pitch measurements of each of second baffle 1902, third baffle 1904, and fifth baffle 1908, respectively. Although each of plurality of baffles 1812, as depicted, has substantially the same pitch, in some illustrative examples, at least one pitch of plurality of baffles 1812 may be different from at least one of the remaining first angles of plurality of baffles 1812.

The value of each of first angle 1914, first angle 1918, and first angle 1924 may be selected from within the range of about 20 degrees to about 40 degrees. As depicted, first angle 1914, first angle 1918, and first angle 1924 may be approximately 25 degrees.

Height 1912 of first baffle 1900 may be greater than height 1916 of second baffle 1902. Height 1920 of third baffle 1904 may be substantially the same as height 1912 of first baffle 1900. Height 1920 of third baffle 1904 may be greater than height 1916 of second baffle 1902. Height 1922 of fourth baffle 1906 may be greater than height 1920 of third baffle 1904. Height 1926 of fifth baffle 1908 may be greater than height 1922 of fourth baffle 1906.

The respective heights of plurality of baffles 1812 may form overpass 1928. As depicted, overpass 1928 may have a varying height. The height of overpass 1928 may be any desirable height or range of heights.

Overpass 1928 may allow a portion of airflow to pass over a number of baffles of plurality of baffles 1812. The portion of the airflow traveling through overpass 1928 may encounter subsequent baffles of plurality of baffles 1812. For example, overpass 1928 may allow a portion of airflow to pass over first baffle 1900. Overpass 1928 may allow a portion of airflow to pass over second baffle 1902. Overpass 1928 may allow a portion of airflow to pass over third baffle 1904. Overpass 1928 may allow a portion of airflow to pass over fourth baffle 1906.

Turning now to FIG. 20, an illustration of a top cross-sectional view of an autoclave with an implementation of a plurality of baffles is depicted in accordance with an illustrative embodiment. FIG. 20 is a top cross-sectional view of autoclave 1800 of FIG. 18.

As depicted, each of plurality of baffles 1812 is a V-shaped wedge. Second baffle 1902 has second angle 2000. Third baffle 1904 has second angle 2002. Fourth baffle 1906 has second angle 2004. As depicted, each of second angle 2000, second angle 2002, and second angle 2004 is substantially the same.

Second angle 2000, second angle 2002, and second angle 2004 are the yaw measurements of each of second baffle 1902, third baffle 1904, and fourth baffle 1906, respectively. Although each of plurality of baffles 1812, as depicted, has substantially the same yaw, in some illustrative examples, at least one second angle of plurality of baffles 1812 may be different from at least one of the remaining second angles of plurality of baffles 1812. In some illustrative examples, at least one of second angle 2000, second angle 2002, or second angle 2004 may be different from at least one of the remaining second angles of plurality of baffles 1812.

The value of each of second angle 2000, second angle 2002, and second angle 2004 may be selected from within the range of about 20 degrees to about 40 degrees. As depicted, second angle 2000, second angle 2002, or second angle 2004 may be approximately 40 degrees.

Figure 21:
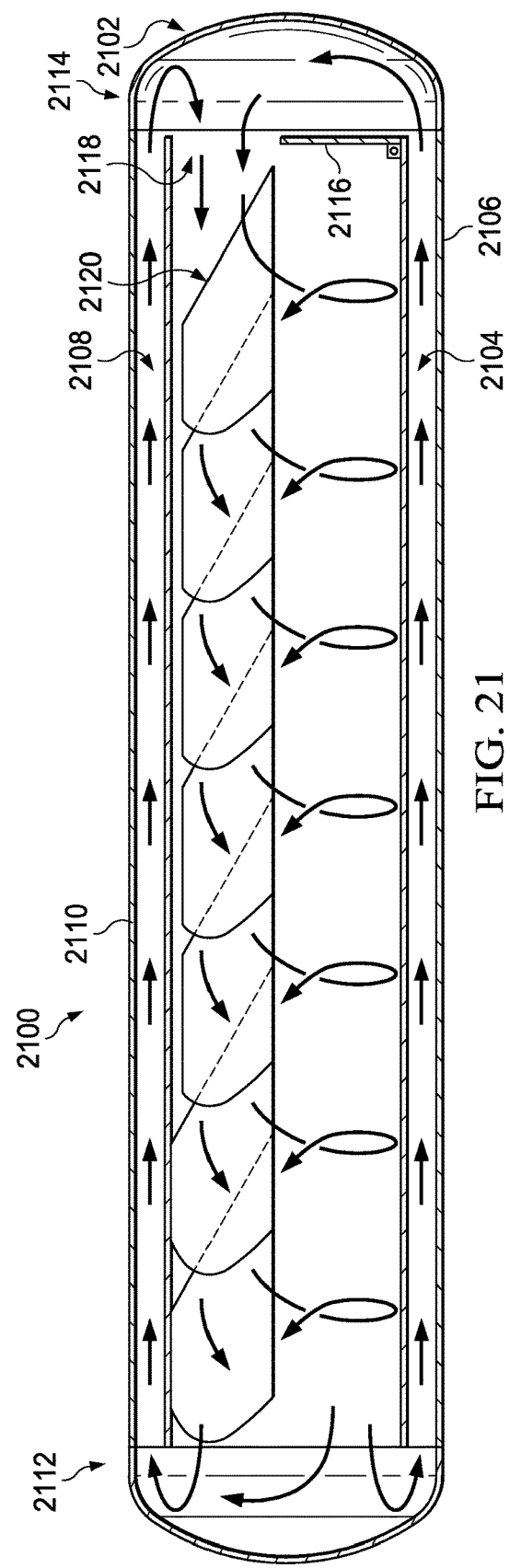
FIG. 21 is an illustration of a side cross-sectional view of an autoclave with an implementation of a plurality of baffles in accordance with an illustrative embodiment.

Turning now to FIG. 21, an illustration of a side cross-sectional view of an autoclave with an implementation of a plurality of baffles is depicted in accordance with an illustrative embodiment. In view 2100, autoclave 2102 has a different design than the autoclaves shown in FIGS. 3-20. For example, autoclave 2102 has annulus 2104 associated with floor 2106 and annulus 2108 associated with ceiling 2110. Autoclave 2102 has first end 2112 and second end 2114. In this illustrative example, autoclave 2102 has diffuser plate 2116 associated with second end 2114 to direct airflow 2118 towards plurality of baffles 2130.

The different components shown in FIGS. 1 and 3-21 may be combined with components in FIG. 2, used with components in FIG. 2, or a combination of the two. Additionally, some of the components in FIGS. 1 and 3-21 may be illustrative examples of how components shown in block form in FIG. 2 can be implemented as physical structures.

The different components shown in FIGS. 1 and 3-21 may be combined with components in FIG. 2, used with components in FIG. 2, or a combination of the two. Additionally, some of the components in FIGS. 1 and 3-21 may be illustrative examples of how components shown in block form in FIG. 2 can be implemented as physical structures.

Figure 22:
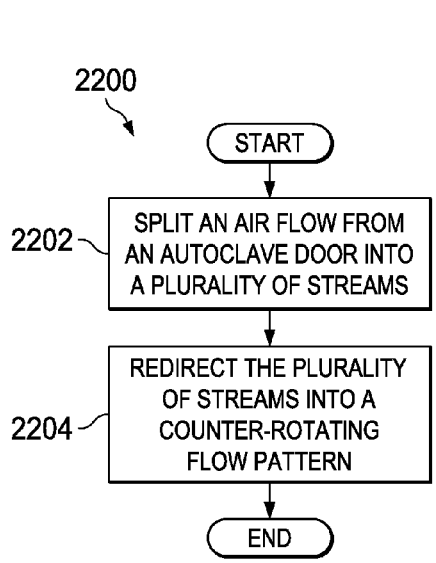
FIG. 22 is an illustration of a flowchart of a process for improving heat transfer of an autoclave in accordance with an illustrative embodiment.

Turning now to FIG. 22, an illustration of a flowchart of a process for improving heat transfer of an autoclave is depicted in accordance with an illustrative embodiment. The process illustrated in FIG. 22 may be implemented within autoclave 204 using plurality of baffles 216 of FIG. 2.

Process 2200 begins by splitting an airflow from an autoclave door into a plurality of streams (operation 2202). Process 2200 then redirects the plurality of streams into a counter-rotating flow pattern (operation 2204). Afterwards the process terminates.

The plurality of streams comprises a first stream that rotates in a first direction and a second stream that rotates in a second direction. The first direction is counter to the second direction.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 2200 may further include associating a plurality of baffles with a ceiling of the autoclave, wherein splitting the airflow from the door of the autoclave into the plurality of streams is performed by the plurality of baffles. In some illustrative examples, the plurality of baffles are associated with the ceiling by mounting the plurality of baffles using structural pads and rails.

Figure 23:
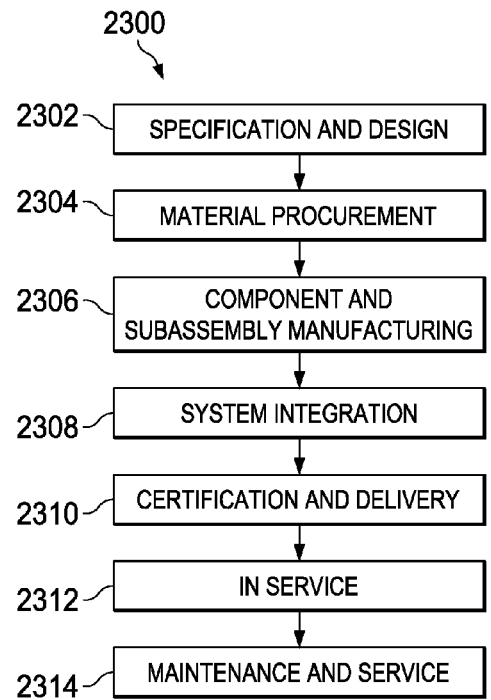
FIG. 23 is an illustration of an aircraft manufacturing and service method in the form of a block diagram in accordance with an illustrative embodiment.
Figure 24:
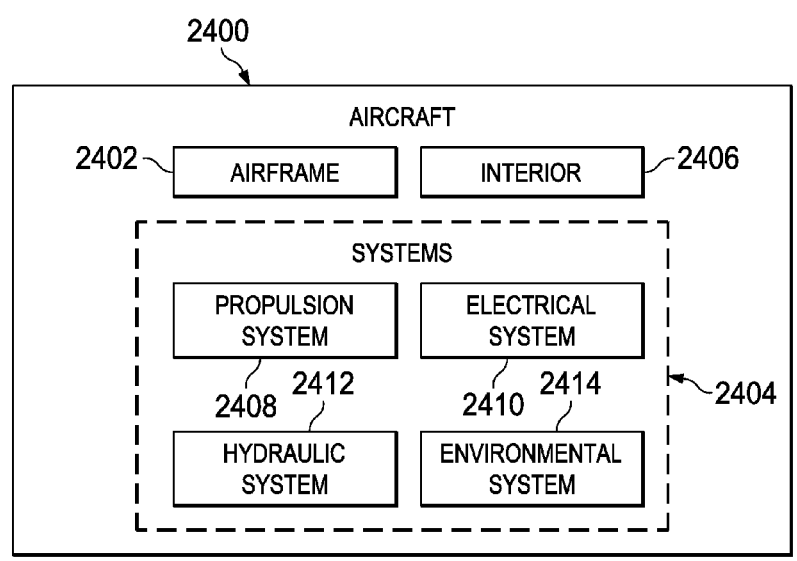
FIG. 24 is an illustration of an aircraft in the form of a block diagram in which an illustrative embodiment may be implemented.

Illustrative embodiments of the disclosure may be described in the context of aircraft manufacturing and service method 2300 as shown in FIG. 23 and aircraft 2400 as shown in FIG. 24. Turning first to FIG. 23, an illustration of an aircraft manufacturing and service method is depicted in accordance with an illustrative embodiment. During pre-production, aircraft manufacturing and service method 2300 may include specification and design 2302 of aircraft 2400 in FIG. 24 and material procurement 2304.

During production, component and subassembly manufacturing 2306 and system integration 2308 of aircraft 2400 in FIG. 24 takes place. Thereafter, aircraft 2400 in FIG. 24 may go through certification and delivery 2310 in order to be placed in service 2312. While in service 2312 by a customer, aircraft 2400 in FIG. 24 is scheduled for routine maintenance and service 2314, which may include modification, reconfiguration, refurbishment, and other maintenance or service.

Each of the processes of aircraft manufacturing and service method 2300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 24, an illustration of an aircraft is depicted in which an illustrative embodiment may be implemented. In this example, aircraft 2400 is produced by aircraft manufacturing and service method 2300 in FIG. 23 and may include airframe 2402 with plurality of systems 2404 and interior 2406. Examples of systems 2404 include one or more of propulsion system 2408, electrical system 2410, hydraulic system 2412, and environmental system 2420. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2300 in FIG. 23. One or more illustrative embodiments may be used during component and subassembly manufacturing 2306. For example, autoclave 204 in FIG. 2 may be used during component and subassembly manufacturing 2306. Autoclave 204 may be used to manufacture a component of aircraft 2400 during component and subassembly manufacturing 2306. Further, autoclave 204 in FIG. 2 may also be used to manufacture components used to perform replacements during maintenance and service 2314.

The illustrative examples present a method and apparatus for improving curing of a number of workpieces in an autoclave. By attaching a plurality of baffles within the autoclave, the air circulation in the autoclave may have improved characteristics. Inserting the plurality of baffles in the autoclave will increase heat transfer of the air within the autoclave.

By increasing heat transfer in the autoclave, a number of workpieces in the autoclave may have an improved cure cycle. For example, curing of the number of workpieces may take less time when a plurality of baffles is present. As another example, curing of the number of workpieces may be more uniform when a plurality of baffles is present.

Further, airflow beneath the number of workpieces may be improved when a plurality of baffles are present. The plurality of baffles may be positioned to split an airflow from a door of the autoclave into a counter-rotating flow pattern. The counter-rotating flow pattern may increase an average velocity of the air within the autoclave.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
a plurality of baffles positioned to split an airflow from a door of an autoclave into a counter-rotating flow pattern, the plurality of baffles comprising a first baffle, a second baffle, and a third baffle, wherein the first baffle and the second baffle are configured to have an overpass so that a portion of air traveling through the overpass strikes the third baffle and is split into a counter-rotating flow by the third baffle.

2. The system of claim 1, wherein the counter-rotating flow pattern comprises a first stream that rotates in a first direction and a second stream that rotates in a second direction, and wherein the first direction is counter to the second direction.

3. The system of claim 1, wherein each of the plurality of baffles comprises at least a portion of a wedge.

4. The system of claim 1, wherein the first baffle comprises a V-shaped wedge having a height, a first angle, a second angle, and a third angle.

5. The system of claim 4, wherein a point of the V-shaped wedge is directed into the airflow.

6. The system of claim 4, wherein a value for at least one of the height, the first angle, the second angle, or the third angle is selected based on at least one of measurements of the autoclave, measurements of a workpiece to be processed in the autoclave, or desirable processing parameters for the workpiece.

7. The system of claim 1, wherein the first baffle and the second baffle are substantially the same.

8. The system of claim 1, wherein the first baffle has at least one of a different height, a different first angle, a different second angle, or a different third angle than the second baffle.

9. The system of claim 1 further comprising:
at least one of a conduit or an annulus that channels supplied air towards the door of the autoclave, wherein the conduit or the annulus channels air through a floor of the autoclave.

10. The system of claim 1, wherein the plurality of baffles are positioned within a cross-sectional area of the autoclave relative to a ceiling of the autoclave, wherein the cross-sectional area is a circular segment.

11. A method for improving heat transfer of an autoclave, the method comprising:
splitting an airflow from a door of the autoclave into a plurality of streams; and
redirecting the plurality of streams into a counter-rotating flow pattern;
wherein a plurality of baffles are positioned to split the airflow from the door of the autoclave into the counter-rotating flow pattern;
wherein the plurality of baffles comprise a first baffle, a second baffle, and a third baffle; and
wherein the first baffle and the second baffle are configured to have an overpass so that a portion of air traveling through the overpass strikes the third baffle and is split into the counter-rotating flow pattern by the third baffle.

12. The method of claim 11, wherein the plurality of streams comprises a first stream that rotates in a first direction and a second stream that rotates in a second direction, and wherein the first direction is counter to the second direction.

13. The method of claim 11 further comprising:
affixing the plurality of baffles to a ceiling of the autoclave, wherein splitting the airflow from the door of the autoclave into the plurality of streams is performed by the plurality of baffles.

14. An apparatus comprising:
a V-shaped wedge affixed to a ceiling of an autoclave and positioned to split an airflow from a door of the autoclave into a counter-rotating flow pattern;
wherein a portion of the airflow passes through an underpass formed by a first baffle and a second baffle before striking the V-shaped wedge and splitting into the counter-rotating flow pattern; and
wherein the V-shaped wedge, the first baffle, and the second baffle comprise a plurality of wedges each of the plurality of wedges having a height, a first angle, a second angle, and a third angle.

15. The apparatus of claim 14, wherein the V-shaped wedge is affixed to the ceiling by a pad and a rail.

16. The apparatus of claim 14, wherein the third angle of each wedge in the plurality of wedges is different than other third angles of the plurality of wedges.

17. The apparatus of claim 14, wherein the first angle of each wedge in the plurality of wedges is substantially the same as other first angles of other wedges in the plurality of wedges.

18. The apparatus of claim 14, wherein a point of the V-shaped wedge is directed into the portion of the airflow that passes through the underpass.

19. The apparatus of claim 14, wherein a value for at least one of the height, the first angle, the second angle, or the third angle is selected based on at least one of measurements of the autoclave, measurements of a workpiece to be processed in the autoclave, or desirable processing parameters for the workpiece.

20. The apparatus of claim 14 further comprising:
a partial wedge affixed to the ceiling of the autoclave having a fourth angle, wherein the fourth angle is substantially the same as the second angle of the V-shaped wedge.

* * * * *